(12) United States Patent
Kim et al.

(10) Patent No.: US 11,394,217 B2
(45) Date of Patent: Jul. 19, 2022

(54) METHOD AND APPARATUS FOR DETERMINING ABNORMAL STATE OF BATTERY

(71) Applicant: Samsung Electronics Co., Ltd., Gyeonggi-do (KR)

(72) Inventors: Byungwook Kim, Gyeonggi-do (KR); Jaemu Ha, Gyeonggi-do (KR); Hyunho Park, Seoul (KR); Ki-Jong Byun, Gyeonggi-do (KR); Jongkyu Lee, Seoul (KR); Jaekyong Choi, Gyeonggi-do (KR); Moo-Young Kim, Seoul (KR)

(73) Assignee: Samsung Electronics Co., Ltd

( * ) Notice: Subject to any disclaimer, the term of this patent is extended or adjusted under 35 U.S.C. 154(b) by 520 days.

(21) Appl. No.: 15/854,377

(22) Filed: Dec. 26, 2017

(65) Prior Publication Data
US 2018/0183252 A1 Jun. 28, 2018

(30) Foreign Application Priority Data
Dec. 23, 2016 (KR) .................. 10-2016-0178249

(51) Int. Cl.
H02J 7/00 (2006.01)
H02J 7/04 (2006.01)
(Continued)

(52) U.S. Cl.
CPC ......... *H02J 7/0047* (2013.01); *H01M 10/425* (2013.01); *H01M 10/44* (2013.01);
(Continued)

(58) Field of Classification Search
CPC ........ H02J 7/0047; H02J 7/042; H02J 7/0048; H02J 7/0049; H02J 7/025; H02J 7/007;
(Continued)

(56) References Cited

U.S. PATENT DOCUMENTS 5,708,348 A 1/1998 Frey et al.
5,945,805 A * 8/1999 Takei ............... G01R 19/16542
320/124

(Continued)

FOREIGN PATENT DOCUMENTS

CN 103299504 9/2013
CN 105375544 3/2016
(Continued)

OTHER PUBLICATIONS

International Search Report dated Apr. 16, 2018 issued in counterpart application No. PCT/KR2017/015353, 7 pages.
(Continued)

*Primary Examiner* — Richard Isla
*Assistant Examiner* — Johali A Torres Ruiz
(74) *Attorney, Agent, or Firm* — The Farrell Law Firm, P.C.

(57) ABSTRACT

A method and an apparatus for detecting a battery state of an electronic device are provided. The electronic device includes a battery, a charger circuit for charging the battery, a measurement circuit for checking a state of the battery, and a processor configured to charge the battery using the charger circuit, determine whether the charging operation satisfies a preset condition, when the charging operation satisfies the preset condition, obtain first state information of the battery using the measurement circuit, determine an abnormal state of the battery at least based on a difference between the first state information and second state information which is obtained when the preset condition is satisfied before the first state information is acquired, and output notification information regarding the abnormal state.

15 Claims, 19 Drawing Sheets

(51) Int. Cl.
  *H02H 7/18* (2006.01)
  *H01M 10/42* (2006.01)
  *H01M 10/44* (2006.01)
  *H01M 10/48* (2006.01)
  *H02J 7/02* (2016.01)

(52) U.S. Cl.
  CPC .............. *H01M 10/48* (2013.01); *H02H 7/18* (2013.01); *H02J 7/042* (2013.01); *H02J 7/0048* (2020.01); *H02J 7/0049* (2020.01); *H02J 7/025* (2013.01)

(58) Field of Classification Search
  CPC ...... H02J 7/0021; H02J 7/0029; H02J 7/0031; H01M 10/44; H01M 10/48; H01M 10/425; H01M 10/488; H01M 10/4228; H02H 7/18; Y02E 60/10; G01R 31/3835
  See application file for complete search history.

(56) References Cited

U.S. PATENT DOCUMENTS

| | | | | |
|---|---|---|---|---|
| 6,545,448 | B1* | 4/2003 | Stanley | H01M 10/4257 320/132 |
| 2003/0052646 | A1* | 3/2003 | Minamiura | B60L 58/14 320/122 |
| 2004/0008031 | A1 | 1/2004 | Arai | |
| 2006/0012339 | A1* | 1/2006 | Lee | H02J 7/0071 320/125 |
| 2006/0087287 | A1* | 4/2006 | Thrap | H02J 7/0016 320/118 |
| 2007/0013344 | A1 | 1/2007 | Aradachi et al. | |
| 2011/0161025 | A1 | 6/2011 | Tomura et al. | |
| 2012/0175953 | A1* | 7/2012 | Ohkawa | H02J 7/0021 307/18 |
| 2013/0205140 | A1 | 8/2013 | Park et al. | |
| 2014/0002008 | A1* | 1/2014 | Chung | H02J 7/0022 320/107 |
| 2014/0253051 | A1 | 9/2014 | Hu et al. | |
| 2014/0300180 | A1* | 10/2014 | Iwashita | B60L 58/18 307/10.1 |
| 2015/0123597 | A1* | 5/2015 | Son | H02J 7/0068 320/107 |
| 2016/0028254 | A1* | 1/2016 | Honoki | H02J 7/007 320/162 |
| 2017/0254854 | A1* | 9/2017 | Honda | G01R 31/3644 |

FOREIGN PATENT DOCUMENTS

| | | |
|---|---|---|
| JP | 2002-262403 | 9/2002 |
| JP | 2006-008038 | 1/2006 |

OTHER PUBLICATIONS

European Search Report dated Nov. 27, 2019 issued in counterpart application No. 17882440.5-1202, 8 pages.
European Search Report dated Jun. 22, 2020 issued in counterpart application No. 17882440.5-1202, 4 pages.
European Search Report dated Oct. 28, 2020 issued in counterpart application No. 17882440.5-1202, 5 pages.
European Search Report dated Sep. 13, 2021 issued in counterpart application No. 17882440.5-1202, 6 pages.
Chinese Office Action dated Mar. 16, 2022 issued in counterpart application No. 201780080199.5, 18 pages.

* cited by examiner

METHOD AND APPARATUS FOR DETERMINING ABNORMAL STATE OF BATTERY

PRIORITY

This application claims priority under 35 U.S.C. § 119(a) to Korean Patent Application Serial No. 10-2016-0178249, which was filed in the Korean Intellectual Property Office on Dec. 23, 2016, the entire content of which is incorporated herein by reference.

BACKGROUND

1. Field of the Disclosure

The present disclosure relates generally to a method and an apparatus for detecting state information, such as an internal failure, of a battery in an electronic device and controlling the electronic device based on the detected state information.

2. Description of Related Art

With recent advances in digital technology, various electronic devices such as a mobile communication terminal, a smart phone, a tablet, a personal computer (PC), a notebook, a personal digital assistant (PDA), a wearable device, and a digital camera have become widely used.

A modern electronic device typically includes a battery having electrical characteristics such as high compatibility to various products and high energy density. The battery can be charged and discharged in rotation, and the electronic device needs to efficiently control the charge and the discharge in order to maintain an adequate operational state and performance of the battery.

For example, the battery is prone to safety issues and is subject to safety accidents such as fire, smoke, and explosion, even when the electronic devices has a safety features. In addition, the electronic device using the battery can be exposed to a shock, overheating, overcharging, or a short circuit due to the usage environment and a user's action. In this case, the safety of the battery may be compromised.

SUMMARY

There are demands to prevent accidents involving the battery from happening. However, the electronic device needs to include a separate detecting device for preventing the accidents, which increases the cost of the electronic device and requires an additional mounting space which increases the volume of the electronic device.

According to an aspect of the present disclosure, a method and an apparatus are provided for monitoring a battery state during battery charging and checking an abnormal battery state based on a monitoring result.

According to another aspect of the present disclosure, a method and an apparatus are provided for detecting state information such as an internal failure, of a battery in an electronic device and controlling the electronic device based on the detected state information.

According to another aspect of the present disclosure, a method and an apparatus are provided for detecting an abnormal state such as current leakage in a battery during battery charge.

According to another aspect of the present disclosure, a method and an apparatus are provided for providing, in response to an abnormal state detected in a battery, various notification information regarding the battery to a user or an external device, and controlling an electronic device to stabilize the battery.

According to one aspect of the present disclosure, an electronic device can include a battery, a charger circuit for charging the battery, a measurement circuit for checking a state of the battery, and a processor. The processor can be configured to charge the battery using the charger circuit, to determine whether the charging operation satisfies a preset condition, when the charging operation satisfies the preset condition, to obtain first state information of the battery using the measurement circuit, to determine an abnormal state of the battery at least based on a difference between the first state information and second state information which is obtained when the preset condition is satisfied before the first state information is acquired, and to output notification information regarding the abnormal state.

According to another aspect of the present disclosure, an electronic device can include a battery, a charger circuit for charging the battery, a measurement circuit for checking a state of the battery, and a processor. The processor can be configured to charge the battery using the charger circuit, after charging the battery, to measure a first voltage and a second voltage with no current supplied from the battery to the electronic device, the first voltage and the second voltage measured at different times respectively, to determine an abnormal state of the battery based on at least the first voltage and the second voltage, and to provide notification information of the abnormal state through an output device.

According to yet another aspect of the present disclosure, a method for operating an electronic device can include charging a battery using a charger circuit, determining whether the charging operation satisfies a preset condition, when the charging operation satisfies the preset condition, obtaining first state information of the battery using a measurement circuit, determining an abnormal state of the battery at least based on a difference between the first state information and second state information which is obtained when the preset condition is satisfied before the first state information is acquired, and outputting notification information regarding the abnormal state.

BRIEF DESCRIPTION OF THE DRAWINGS

The above and other aspects, features, and advantages of various embodiments of the present disclosure will be more apparent from the following description taken in conjunction with the accompanying drawings, in which.

DETAILED DESCRIPTION

Figure 1:
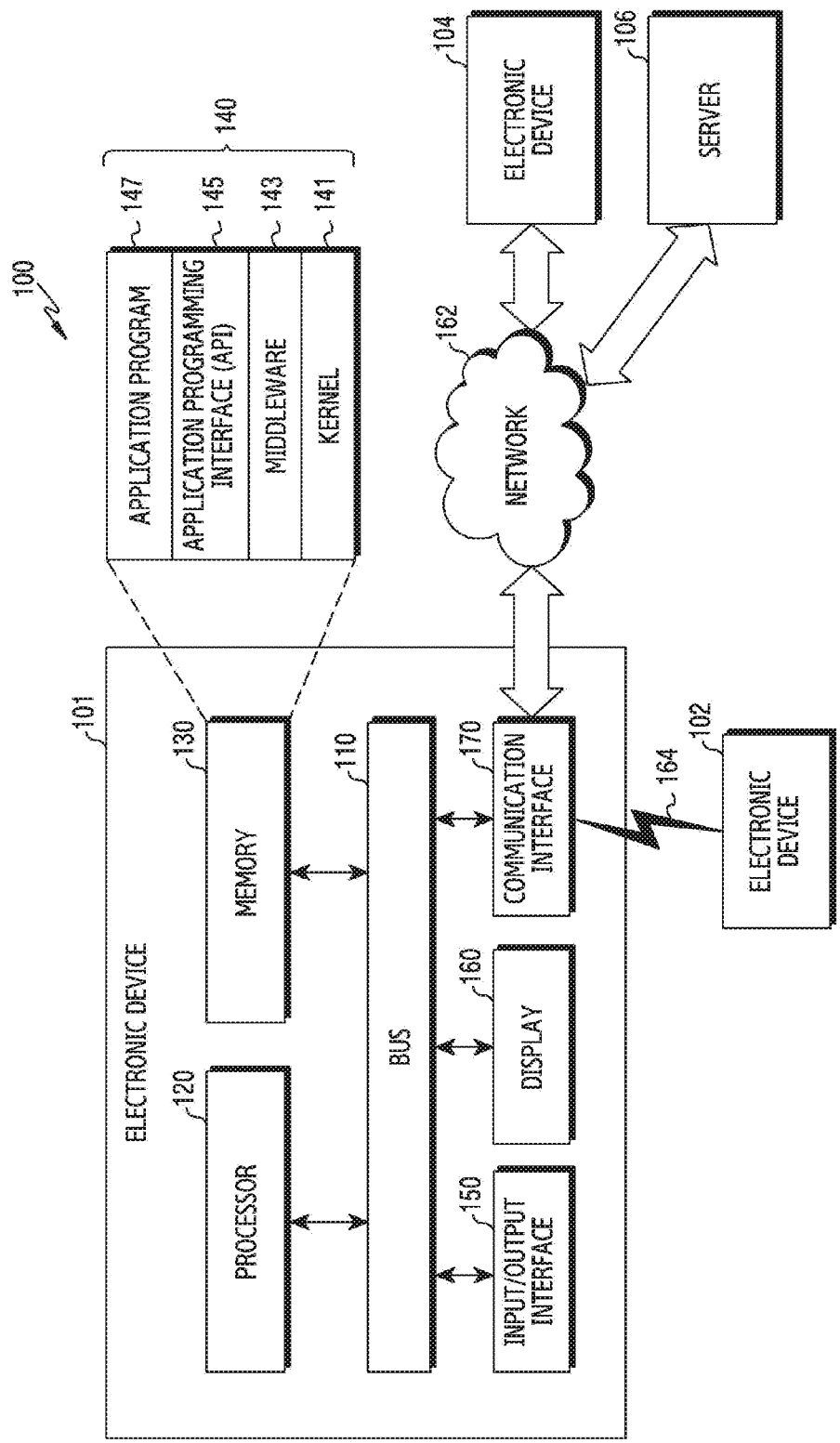
FIG. 1 illustrates a network environment including an electronic device according to various embodiments of the present disclosure.

Hereinafter, various embodiments of the present disclosure are described with reference to the accompanying drawings. It should be understood, however, that it is not intended to limit the various embodiments of the present disclosure to the particular form disclosed, but, on the contrary, it is intended to cover all modifications, equivalents, and alternatives falling within the spirit and scope of the various embodiments of the present disclosure. Like reference numerals denote like components throughout the drawings. A singular expression includes a plural concept unless there is a contextually distinctive difference therebetween.

In the present disclosure, the expressions "A or B", "A and/or B", etc. may include all possible combinations of items enumerated together. The term "and/or" covers a combination of a plurality of items, or any of the plurality of items. Although expressions such as "1$^{st}$", "2$^{nd}$", "first", and "second" may be used to express corresponding elements, they do not limit the corresponding elements. When a certain element (e.g., 1$^{st}$) is mentioned as being "operatively or communicatively coupled with/to" or "connected to" a different element (e.g., 2$^{nd}$), the certain element is directly coupled with/to another constitutional element or can be coupled with/to the different element via another element (e.g., 3$^{rd}$).

The expression "configured to" used in the present disclosure may be interchangeably used with, for example, "suitable for", "having the capacity to", "adapted to", "made to", "capable of", or "designed to" in a hardware or software manner according to the situation. An expression "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor (AP)) capable of performing corresponding operations by executing one or more software programs stored in a memory device.

An electronic device according to various embodiments of the present disclosure, for example, may include at least one of a smartphone, a tablet PC, a mobile phone, a video phone, an electronic book (e-book) reader, a desktop PC, a laptop PC, a netbook computer, a workstation, a server, a PDA, a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic accessory, an electronic tattoo, a smart mirror, or a smart watch).

According to various embodiments of the present disclosure, the electronic device (e.g., a home appliance) may include at least one of, for example, a television, a digital versatile disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) apparatus, a magnetic resonance imaging (MRI) apparatus, a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device, and a gyro-compass), avionics, security devices, an automotive head unit, a robot for home or industry, an automatic teller machine (ATM), a point of sales (POS) device, or an Internet of things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned devices. The electronic device may be a flexible device or foldable device. Further, the electronic device is not limited to the aforementioned devices, and may include a new electronic device according to the development of new technology.

FIG. 1 illustrates an electronic device 101 within a network environment 100 according to various embodiments of the present disclosure.

Referring to FIG. 1A, the electronic device 101 may include a bus 110, a processor 120 (e.g., including processing circuitry), a memory 130, an input/output interface 150 (e.g., including input/output circuitry), a display 160, and a communication interface 170 (e.g., including communication circuitry). The electronic device 101 may omit at least one of the elements or additionally add another element.

The bus 110 may, for example, include circuitry connecting the elements 120 to 170 with another electronic device and for forwarding communication (e.g., a control message and/or data) between the elements.

The processor 120 may include one or more of a CPU, an AP, a communication processor (CP), or an image signal processor (ISP). The processor 120 may, for example, execute an operation or data processing for control and/or communication of at least another element of the electronic device 101.

The memory 130 may include a volatile and/or non-volatile memory. The memory 130 may, for example, store a command or data related to at least another element of the electronic device 101. According to an embodiment of the present disclosure, the memory 130 may store software and/or a program 140. For example, the program 140 may include a kernel 141, a middleware 143, an application programming interface (API) 145, applications 147, etc. At least some of the kernel 141, the middleware 143, or the API 145 may be called an operating system (OS).

The memory 130 can store one or more programs executed by the processor 120, and may temporarily store input/output data. The input/output data can include, for example, battery data (e.g., voltage measurement value, current measurement value, etc.), moving pictures, images, photos, or audio files. According to various embodiments of the present disclosure, the memory 130 can store data obtained, data acquired in real time can be stored in a temporary storage device (e.g., a buffer), and data can be stored in a storage device which allows long-time storage. The memory 130 can include a computer-readable recording medium which records a program for making the processor 120 execute a method.

The kernel 141 may, for example, control or manage system resources (e.g., the bus 110, the processor 120, the memory 130, etc.) which are used for executing operations or functions implemented in other programs (e.g., the middleware 143, the API 145, or the applications 147). Also, the kernel 141 may provide an interface capable of enabling the middleware 143, the API 145, or the applications 147 to access an individual element of the electronic device 101, thereby controlling or managing the system resources of the electronic device 101.

The middleware 143 may, for example, perform a relay role of enabling the API 145 or the applications 147 to communicate and exchange data with the kernel 141. Also, the middleware 143 may process one or more requests received from the applications 147 in accordance with priority. For example, the middleware 143 may grant at least one of the applications 147 a priority for utilizing the system resources (e.g., the bus 110, the processor 120, the memory 130, etc.) of the electronic device 101, and process the one or more requests. The API 145 is, for example, an interface enabling the applications 147 to control a function provided by the kernel 141 or the middleware 143. The API 145 may, for example, include at least one interface or function (e.g., an instruction) for file control, window control, image processing, character control, etc.

The input/output interface 150 may, for example, forward a command or data inputted from a user or another external device, to another element of the electronic device 101, or output a command or data received from another element of the electronic device 101, to the user or another external device. For example, the input/output interface 150 may include at least one of a wired/wireless headphone port, an external charger port, a wired/wireless data port, a memory card port, an audio input/output port, a video input/output port, a earphone port, etc.

The display 160 may, for example, include a liquid crystal display (LCD), a light emitting diode (LED) display, an organic light emitting diode (OLED) display, a microelectromechanical systems (MEMS) display, or an electronic paper display. For example, the display 160 may display various content (e.g., a text, an image, a video, an icon, a symbol, etc.) to a user. The display 260 may include a touch screen, and may receive a touch, a gesture, or a proximity or hovering input by using, for example, an electronic pen or a part of a user's body.

The display 160 can display, for example, a visual output to the user. The visual output can include text, graphic, video, and their combination. The display 160 can display (e.g., output) various information processed in the electronic device 101. For example, the display 160 can display a user interface (UI) or a graphical UI (GUI) for using the electronic device 101. According to various embodiments of the present disclosure, the display 160 can display various UIs (e.g., GUIs) regarding the operation (e.g., notification information output) executed by the electronic device 101.

In various embodiments of the present disclosure, the display 160 can include a curved display or a bent display which can be curved, bent, or rolled without any damage through a flat display or a thin and flexible substrate like paper. The curved display can be coupled with a housing (e.g., a bezel, a main body, etc.) to maintain its bent shape. In addition to the curved display, the electronic device 101 may be implemented using a display device which can be freely bent and spread like a flexible display. The display 160 can achieve flexibility for the bending and the spreading by replacing a glass substrate surrounding liquid crystals in an LCD, an LED, an OLED, or an AMOLED with a plastic film. The display 160 can be extended to at least one side (e.g., at least one of a left side, a right side, an upper side, a lower side, etc.) of the electronic device 101, bent below a radius of curvature (e.g., the radius of curvature of 5 cm, 1 cm, 7.5 mm, 5 mm, 4 mm, etc.) for operating the curve display, and then coupled to the side of the housing.

The communication interface 170 may, for example, establish communication between the electronic device 101 and an external device (e.g., a first external electronic device 102, a second external electronic device 104, or a server 106). For example, the communication interface 170 may be connected to a network 162 by a wireless communication or wired communication, to communicate with the external device.

The wireless communication may, for example, include cellular communication that utilizes at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), etc. According to an embodiment of the present disclosure, the wireless communication 164 of FIG. 1 can include, for example, at least one of wireless fidelity (WiFi), light fidelity (LiFi), wireless gigabit alliance (Wi-Gig), Bluetooth™, Bluetooth low energy (BLE), Zigbee, near field communication (NFC), magnetic secure transmission (MST), radio frequency (RF), and body area network (BAN). The wireless communication may include global navigation satellite system (GNSS). The GNSS may, for example, be a GPS, a global navigation satellite system (Glonass), Beidou navigation satellite system (Beidou), or Galileo which is the European global satellite-based navigation system. In the present disclosure, the term "GPS" may be used interchangeably with the term "GNSS". The wired communication may, for example, include at least one of a universal serial bus (USB), a high definition multimedia interface (HDMI), recommended standard-232 (RS-232), plain old telephone service (POTS), etc. The network 162 may include a telecommunications network, for example, at least one of a computer network (e.g., local area network (LAN) or wide area network (WAN)), the Internet, or a telephone network.

The first and second electronic devices 102 and 104 each may be a device of the same or different type from that of the electronic device 101. According to various embodiments of the present disclosure, all or some of the operations executed in the electronic device 101 may be executed in another or a plurality of electronic devices (e.g., the electronic devices 102 and 104, or the server 106). When the electronic device 101 has to perform a function or service automatically or by a request, the electronic device 101 may, instead of or additionally to executing the function or service itself, request at least a partial function associated with this from another device. The other electronic device may execute the requested function or additional function, and forward the execution result to the electronic device 101. The electronic device 101 may process the received result as it is or perform additional processing, thereby providing the requested function or service. For this, a cloud computing, distributed computing, or client-server computing technology may be used.

The server 106 can include at least one of, for example, a certification server, an integration server, a provider server or a telecommunication operator server, a content server, an Internet server, and a cloud server.

Figure 2:
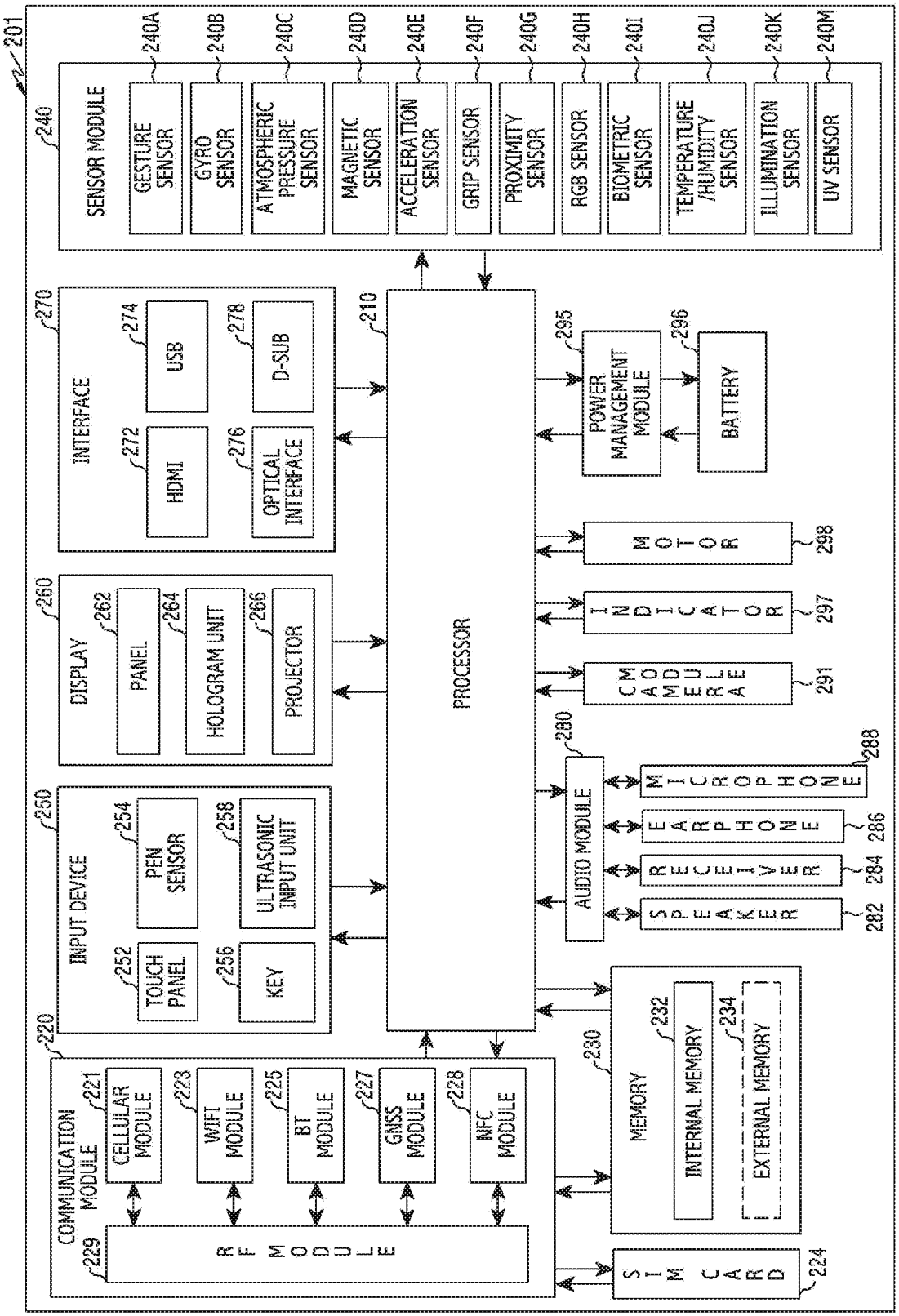
FIG. 2 illustrates a block diagram of an electronic device according to various embodiments of the present disclosure.

FIG. 2 is a block diagram of an electronic device according to various embodiments of the present disclosure.

The electronic device 201 may, for example, include the entire or a part of the electronic device 101. The electronic device 201 may include one or more processors 210 (e.g., an application processor (AP)), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

According to various embodiments of the present disclosure, the electronic device 201 does not necessarily include all the components of FIG. 2, and can include more or less components than those in FIG. 2. For example, the electronic device 20 may not include some components according to its type. The components of the electronic device 201 can be received in its housing (e.g., a bezel, a main body, etc.) or mounted outside the electronic device 201.

The processor 210 may, for example, operate an OS or an application program, to control a majority of hardware or software elements connected to the processor 210, and may perform various data processing and operations. The processor 210 may be, for example, implemented as a system on chip. According to an embodiment of the present disclosure, the processor 210 may further include a graphic processing unit (GPU) and/or an ISP. The processor 210 may include at least some (e.g., cellular module 221) of the elements shown in FIG. 2 as well. The processor 210 may load a command or data received from at least one of the other elements (e.g., non-volatile memory) to a volatile memory and process the loaded command or data, and may store the result data in the non-volatile memory.

According to various embodiments of the present disclosure, the processor 210 can control operations of the electronic device 201. The processor 210 can include one or more processors. For example, the processor 210 can include a CP, an AP, an interface (e.g., general purpose input/output (GPIO)), or an internal memory, as separate components or can integrate them on one or more integrated circuits (ICs). The AP can perform various functions for the electronic device 201 by executing various software programs, and the CP can process and control voice communications and data communications. The processor 210 can execute a particular software module (e.g., an instruction set) stored in the memory 230 and thus carry out various functions corresponding to the module.

According to various embodiments of the present disclosure, the processor 210 can control hardware modules such as the audio module 280, the interface 270, the display 260, the camera module 291, the communication module 220, and the power management module 295. The processor 210 can be electrically connected with the power management module 295, the display 260, and the memory 230 of the electronic device 201.

According to an embodiment of the present disclosure, the processor 210 can process operations for detecting an abnormal battery state (e.g., leakage, failure, etc.). The processor 210 can control charging of a battery having a preset capacity (e.g., a full capacity) up to the preset capacity using a charger circuit, monitoring the battery using a measuring circuit at preset capacities, obtaining first information and second information about the battery at different times based on monitoring results, determining a battery state based on a difference of the first information and the second information, and outputting notification information of the battery based on a determination result.

The communication module 220 may have the same or similar construction as the communication interface 170. The communication module 220 may, for example, include a cellular module 221, a WiFi module 223, a Bluetooth (BT) module 225, a GNSS module 227, an NFC module 228, and an RF module 229. For example, the communication module 220 may further include a WiGig module. According to an embodiment of the present disclosure, the WiFi module 223 and the WiGig module may be integrated into one IC.

The cellular module 221 may, for example, provide voice telephony, video telephony, a text service, an Internet service, etc. through a telecommunication network. According to an embodiment of the present disclosure, the cellular module 221 may perform the distinction and authentication of the electronic device 201 within the telecommunication network by using the SIM 224. The cellular module 221 may perform at least some functions among functions the processor 210 may provide. The cellular module 221 may include a CP.

According to various embodiments of the present disclosure, at least some (e.g., two or more) of the cellular module 221, the WiFi module 223, the BT module 225, the GNSS module 227, or the NFC module 228 may be included within one IC or IC package.

The RF module 229 may, for example, transmit and/or receive a communication signal (e.g., an RF signal). The RF module 229 may, for example, include a transceiver, a power amplifier module (PAM), a frequency filter, a low noise amplifier (LNA), an antenna, etc. According to an embodiment of the present disclosure, at least one of the cellular module 221, the WiFi module 223, the BT module 225, the GNSS module 227, or the NFC module 228 may transmit and/or receive an RF signal through a separate RF module.

The WiFi module 223 may, for example, represent a module for forming a wireless LAN link with a wireless Internet connection and an external device (e.g., electronic device 102 or server 106). The WiFi module 223 may be embedded or enclosed in the electronic device 201. For example, WiFi, WiGig, WiBro, world interoperability for microwave access (WiMax), high speed downlink packet access (HSDPA), or millimeter wave (mmWave) may be used as the wireless Internet technology. The WiFi module 223 may be connected to an external device that is directly connected to the electronic device or via a network (e.g., a wireless Internet network or network 162). It is possible to transmit various types of data from the electronic device 201 to the outside or receive various types of data from the outside. The WiFi module 223 may be kept turned on or turned on/off according to the setting of the electronic device or the user input.

The BT module 225 and the NFC module 228 may, for example, represent a short range communication module for performing a short range communication. For example, Bluetooth, BLE, radio frequency identification (RFID), infrared communication (e.g., Infrared Data Association (IrDA)), ultra wideband (UWB), Zigbee, or NFC may be used as the local communication technology. The short-range communication module interworks with an external device (e.g., electronic device 102) connected to the electronic device 201 via a network (e.g., a local area communication network) and may be transmitted to or received from the device. The short range communication module (e.g., BT module 225 and NFC module 228) may be kept on at all times or turned on/off according to the setting of the electronic device 201 or user input.

The SIM 224 may, for example, include a card including a SIM and/or an embedded SIM. The SIM 224 may include unique identification information (e.g., integrated circuit card identifier (ICCID)) or subscriber information (e.g., international mobile subscriber identity (IMSI)).

The memory 230 may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM), etc.), and/or a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive, or a solid state drive (SSD)). The external memory 234 may include a flash drive, for example, a compact flash (CF), a secure digital (SD), a micro-SD, a mini-SD, an extreme digital (xD), a multi media card (MMC), a memory stick, etc. The external memory 234 may be operatively or physically coupled with the electronic device 201 through various interfaces.

According to various embodiments of the present disclosure, the memory 230 can store one or more programs, data, or instructions allowing the processor 210 to charge the battery having a preset capacity (e.g., a full capacity) up to the preset capacity using a charger circuit, monitor the battery using a measuring circuit at preset capacities, obtain first information and second information of the battery at different times based on monitoring results, determine a battery state based on a difference of the first information and the second information, and output notification information of the battery based on a determination result.

The memory 230 can include an extended memory 234 or an internal memory 232. The electronic device 201 may operate in association with web storage which performs as a storage function of the memory 230 on the Internet.

The memory 230 can store one or more software programs or software modules. For example, software components can include an OS software module, a communication software module, a graphic software module, a UI software module, an MPEG module, a camera software module, and one or more application software modules (e.g., a battery management module, a battery leakage detection module, etc.). The module which is the software component can be represented as a set of instructions and accordingly can be referred to as an instruction set. The module may be referred to as a program. The memory 230 can include additional modules (e.g., instructions) in addition to the above-mentioned modules. Alternatively, if necessary, the memory 230 may not use some of the modules.

The OS software module can include various software components for controlling general system operations. Such general system operation control can include, for example, memory management and control, and power control and management. The OS software module can also process normal communication between various hardware or devices, and software components or modules.

The communication software module can enable communication with another electronic device, such as a wearable device, a smart phone, a computer, a server, or a portable terminal, through the communication module 220 or the interface 270. Also the communication software module can be configured in a protocol structure corresponding to its communication method.

The graphic software module can include various software components for providing and displaying graphics on the display 260. The term "graphics" can encompass texts, web pages, icons, digital images, videos, and animations.

The UI software module can include various software components relating to the UI. For example, the UI software module is involved in a status change of the UI and a condition for the UI status change.

The MPEG module can include a software component enabling digital content (e.g., video, audio, etc.), processes, and functions (e.g., content creation, reproduction, distribution, transmission, etc.).

The camera software module can include camera related software components allowing camera related processes and functions.

The application module can include a web browser including a rendering engine, an e-mail application, an instant message application, a word processing application, a keyboard emulation application, an address book application, a touch list, a widget application, a digital right management (DRM) application, an iris scan application, a context cognition application, a voice recognition application, and a location based service. The application module can include an application module for detecting current leakage inside the battery based on at least part of battery voltage or current, and outputting notification information to the user.

The sensor module 240 may, for example, measure a physical quantity or sense an activation state of the electronic device 201, and convert measured or sensed information into an electrical signal. The sensor module 240 may, for example, include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature-humidity sensor 240J, an illumination sensor 240K, or an ultra violet (UV) sensor 240M. Additionally or alternatively, the sensor module 240 may, for example, include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuitry for controlling at least one or more sensors belonging therein. In an embodiment of the present disclosure, the electronic device 201 may further include a processor configured to control the sensor module 240 as a part of the processor 210 or separately, to control the sensor module 240 while the processor 210 is in a sleep state.

The input device 250 may, for example, include a touch panel 252, a (digital) pen sensor 254, a key 256, or an ultrasonic input device 258. The touch panel 252 may, for example, use at least one scheme among a capacitive overlay scheme, a pressure sensitive scheme, an infrared beam scheme, or an ultrasonic scheme. Also, the touch panel 252 may further include a control circuitry as well. The touch panel 252 may further include a tactile layer, to provide a tactile response (e.g., a touch coordinate) to a user.

The (digital) pen sensor 254 may, for example, be a part of the touch panel 252, or include a separate sheet for recognition. The key 256 may, for example, include a physical button, an optical key, or a keypad. The ultrasonic input device 258 may detect an ultrasonic wave generated in an input tool through a microphone 288 to identify data corresponding to the detected ultrasonic wave. According to various embodiments of the present disclosure, the input device 250 can include a digital pen. The input device 250 can receive a force touch.

The display 260 may include a panel 262, a hologram device 264, a projector 266, and/or a control circuitry for controlling them.

The panel 262 may, for example, be implemented to be flexible, transparent, or wearable. The panel 262 may be configured as one or more modules along with the touch panel 252. According to an embodiment of the present disclosure, the panel 262 may include a pressure sensor or force sensor capable of measuring pressure information (e.g., a pressure coordinate and a pressure intensity) on a user's touch. The pressure sensor may be implemented integrally with the touch panel 252, or be implemented as one or more sensors separate from the touch panel 252.

The panel 262 can be received in the display 260 and detect a user input which contacts or approaches a surface of the display 260. The user input can include a touch input or a proximity input based on at least one of single-touch, multi-touch, hovering, and air gesture. The panel 262 can receive a user input which initiates an operation for using the electronic device 201, and generate an input signal according to the user input. The panel 262 can convert a change such as pressure applied to a particular point of the display 260 or capacitance generating at a particular portion of the display 260, to an electrical input signal. The panel 262 can detect a location or an area of an input means (e.g., a user finger, a digital pen, etc.) which touches or approaches the surface of the display 260. The panel 262 can also detect the pressure (e.g., force touch) of the touch according to the adopted touch method.

The hologram device 264 may show a three-dimensional image in the air by using the interference of light. The projector 266 may project light onto a screen to display an image. The screen may, for example, be disposed inside or outside the electronic device 201.

The interface 270 may, for example, include an HDMI 272, a USB 274, an optical interface 276, or a D-subminiature (D-sub) 278. The interface 270 may be, for example, included in the communication interface 170. Additionally or alternatively, the interface 270 may, for example, include a mobile high-definition link (MHL) interface, an SD card/MMC interface, or an IrDA standard interface.

The interface 270 can receive data from another electronic device, or receive and forward power to the components of the electronic device 201. The interface 270 can send data of the electronic device 201 to another electronic device. For example, the interface 270 can include a wired/wireless headset port, an external charger port, a wired/wireless data port, a memory card port, an audio input/output port, a video input/output port, and an earphone port.

The audio module 280 may, for example, convert a sound and an electrical signal interactively. At least some elements of the audio module 280 may, for example, be included in the input/output interface 150. The audio module 280 may, for example, process sound information that is input or output through a speaker 282, a receiver 284, an earphone 286, the microphone 288, etc. The audio module 280 may transmit the audio signal input from the processor 210 to an output device (e.g., a speaker 282, a receiver 284, or an earphone 286). The audio module 280 may transmit an audio signal, such as a voice, received from the input device (e.g., the microphone 288) to the processor 210. The audio module 280 may convert audio/sound data into audible sound, may output the converted audible sound through the output device under the control of the processor 210. The audio module 280 may convert the audio signal, such as voice, received from the input device into a digital signal, and may transmit the converted digital signal to processor 210.

The speaker 282 or the receiver 284 may receive audio data from the communication module 220 or stored in the memory 230. The speaker 282 or the receiver 284 may output an acoustic signal related to various operations (e.g., functions) performed in the electronic device 201. The microphone 288 may receive an external acoustic signal and convert the signal to electrical voice data. The microphone 288 may be implemented with various noise reduction algorithms for eliminating noise generated in receiving an external sound signal. The microphone 288 may be responsible for the input of audio streaming such as voice commands, etc.

The camera module 291 may be, for example, a device able to capture a still image and a video. According to an embodiment of the present disclosure, the camera module 291 may include one or more image sensors (e.g., a front sensor or rear sensor), a lens, an ISP, or a flash (e.g., an LED, a xenon lamp, etc).

According to various embodiments of the present disclosure, the camera module 291 may support a camera function of the electronic device 201. Under control of the processor 210, the camera module 291 may capture a subject and send the captured data (e.g., an image) to the display 260 and the processor 210. The camera module 291 may include, for example, a first camera (e.g., a color (RGB) camera) for obtaining color information and a second camera (e.g., an IR camera) for obtaining depth information (e.g., location information, distance information of a subject, etc.). The first camera may be a front camera on a front side of the electronic device 201. The front camera may be replaced by the second camera, and may not be disposed in the front side of the electronic device 201. The first camera may be disposed on the front side of the electronic device 201 together with the second camera. The first camera may be a rear camera on a rear side of the electronic device 201. The first camera may include both of the front camera and the second camera on the front side and the rear side, respectively, of the electronic device 201.

The camera module 291 may include an image sensor. The image sensor may be implemented using a charged coupled device (CCD), a complementary metal-oxide semiconductor (CMOS), etc., without limitation.

The power management module 295 may, for example, manage power of the electronic device 201. According to an embodiment of the present disclosure, the power management module 295 may include a power management integrated circuit (PMIC), a charger IC, or a battery gauge. The PMIC may employ a wired and/or wireless charging scheme. The wireless charging scheme may, for example, include a magnetic resonance scheme, a magnetic induction scheme, an electromagnetic wave scheme, etc. The wireless charging scheme may further include a supplementary circuitry for wireless charging, for example, a coil loop, a resonance circuitry, a rectifier, etc. The battery gauge may, for example, measure a level of the battery 296, a voltage, an electric current, or a temperature. The battery 296 may, for example, include a rechargeable battery and/or a solar battery.

The indicator 297 may display a specific state (e.g., a booting state, a message state, a charging state, etc.) of the electronic device 201 or a part (e.g., the processor 210) of the electronic device 201. The motor 298 may convert an electrical signal into a mechanical vibration, and may generate a vibration, a haptic effect, etc. The electronic device 201 may, for example, include a mobile TV support device (e.g., a GPU) capable of processing media data according to the standards of digital multimedia broadcasting (DMB), digital video broadcasting (DVB), mediaFlo™, etc. The elements described in the present disclosure may each consist of one or more components, and a name of the corresponding element may vary according to the kind of the electronic device. In various embodiments of the present disclosure, the electronic device 201 may omit some elements, or further include additional elements, or combine some of the elements and configure the same as one entity to identically perform functions of the corresponding elements before combination.

Figure 3:
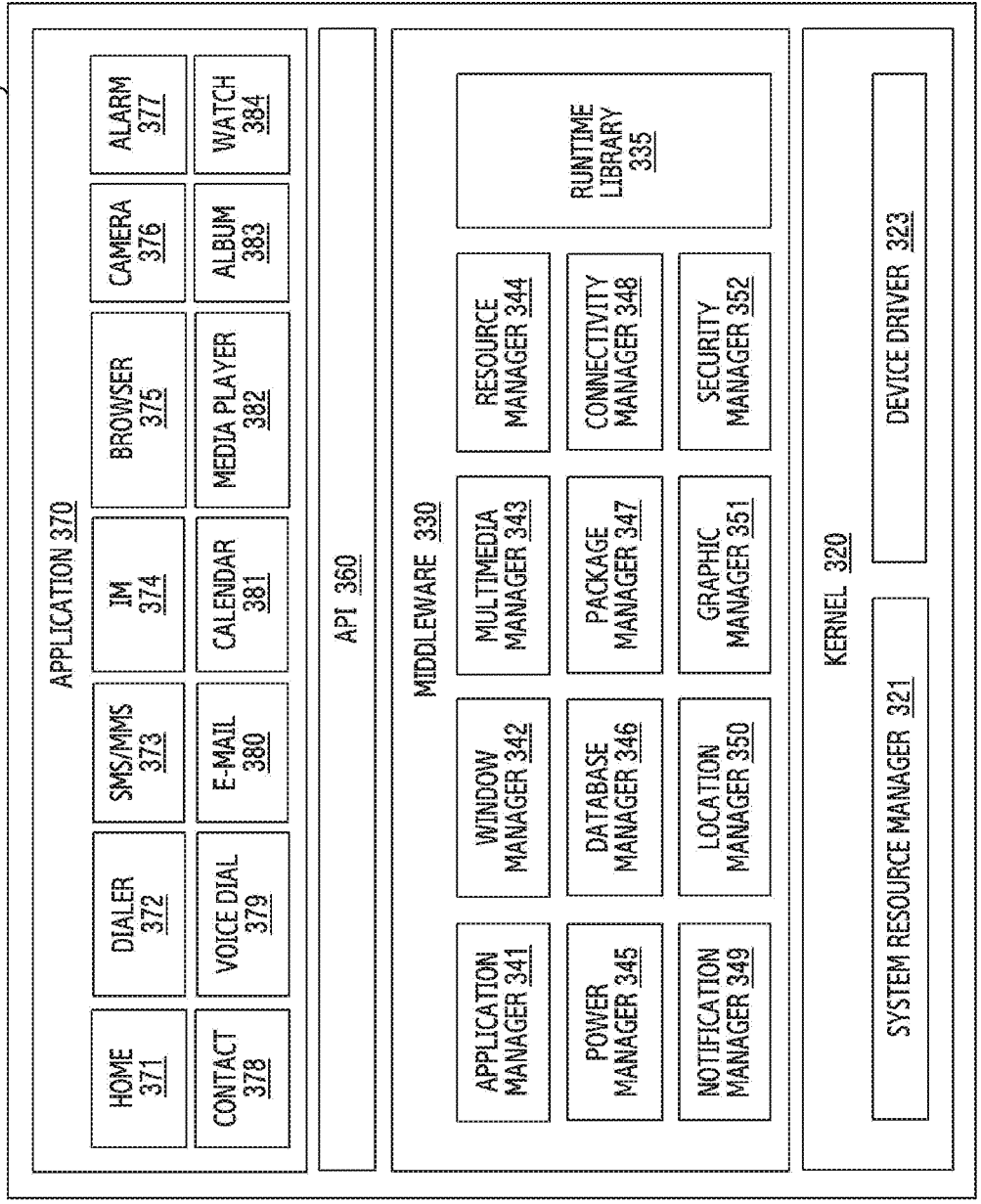
FIG. 3 illustrates a block diagram of a program module according to various embodiments of the present disclosure.

FIG. 3 illustrates a block diagram of a program module according to various embodiments of the present disclosure. The program module 310 may include an OS controlling resources related to an electronic device 201 and/or various applications 147 run on the OS. The OS may, for example, include Android™, iOS™, Windows™ Symbian™, Tizen™, or Bada™.

Referring to FIG. 3, the program module 310 may include a kernel 320, a middleware 330, an API 360, and/or an applications 370. At least some of the program module 310 may be preloaded onto an electronic device, or be downloaded from an external electronic device (e.g., the electronic devices 102 and 104, the server 106, etc.).

The kernel 320 may, for example, include a system resource manager 321 and/or a device driver 323. The system resource manager 321 may control of a system resource, an allocation thereof, or a recovery thereof. According to an embodiment of the present disclosure, the system resource manager 321 may include a process management unit, a memory management unit, or a file system management unit. The device driver 323 may, for example, include a display driver, a camera driver, a Bluetooth driver, a shared memory driver, a USB driver, a keypad driver, a WiFi driver, an audio driver, a touch device driver, a pressure device driver, or an inter-process communication (IPC) driver.

The middleware 330 may, for example, provide a function that the application 370 commonly needs, or provide various functions to the applications 370 through the API 360 so that the applications 370 may make use of limited system resources within an electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may, for example, include a library module that a compiler utilizes to add a new function through a programming language while the applications 370 is executed. The runtime library 335 may perform input/output management, memory management, or arithmetic function processing. The application manager 341 may, for example, manage a lifecycle of the application 370. The window manager 342 may manage a GUI resource which is used for a screen. The multimedia manager 343 may determine a format required for playing media files, and perform encoding or decoding of the media file by using a codec suitable to the corresponding format. The resource manager 344 may manage source code of the applications 370 or memory space. The power manager 345 can, for example, manage a capacity, a temperature, or a power of the battery, and determine or provide power information required for the operations of the electronic device using corresponding information. According to an embodiment of the present disclosure, the power manager 345 can operate with a basic input/output system (BIOS). The database manager 346 may, for example, generate, search, or change a database that will be used in the applications 370. The package manager 347 may manage the installing or updating of an application that is distributed in the form of a package file.

The connectivity manager 348 may, for example, manage wireless connectivity. The notification manager 349 may, for example, provide an event such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication. According to an embodiment of the present disclosure, the middleware 330 may include a telephony manager for managing a voice or video call function of an electronic device, or a middleware module capable of forming a combination of functions of the aforementioned elements. The middleware 330 may provide a module specialized by type of the OS. The middleware 330 may dynamically delete some of the existing elements, or add new elements. The API 360 is, for example, a set of API programming functions, and may be provided to have another construction in accordance with the OS. For example, Android or iOS may provide one API set on a per-platform basis, and Tizen may provide two or more API sets on a per-platform basis.

The applications 370 may, for example, include a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a watch application 384, a health care application (e.g., measuring momentum of the user, a blood sugar level, etc.), or an environment information (e.g., air pressure, humidity, or temperature information) provision application. According to various embodiments of the present disclosure, the applications 370 can include a healthcare (e.g., measure an exercise amount or blood sugar level) application, an environmental information provision (e.g., provide air pressure, humidity, or temperature information) application, a battery failure detection application, and a battery failure notification application. The applications 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay, to the external electronic device, notification information generated from another application of the electronic device, or receive notification information from the external electronic device and provide the received notification information to a user. The device management application may, for example, install, delete, or update a function of the external electronic device (e.g., turn-on/turn-off of the external electronic device itself or some components, or adjustment of a display brightness or resolution) which communicates with the electronic device, or an application which operates in the external electronic device. The applications 370 may include an application (e.g., a healthcare application of a mobile medical instrument) designated according to an attribute of the external electronic device. The applications 370 may include an application received from the external electronic device. At least a part of the program module 310 may be implemented (e.g., executed) as software, firmware, hardware, or a combination of at least two or more of them, and may include a module for performing one or more functions, a program, a routine, sets of instructions, or a process.

The term "module" as used herein may, for example, mean a unit including one of hardware, software, and firmware, or a combination of two or more of them. The term "module" may be interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application specific integrated circuit (ASIC) chip, a field programmable gate arrays (FPGA), and a programmable-logic device for performing operations which are known or will be developed hereinafter.

According to various embodiments of the present disclosure, at least some of the devices (e.g., modules or functions thereof) or the method (e.g., operations) according to the present disclosure may be implemented by a command stored in a computer-readable storage medium in a program module form. The instruction, when executed by a processor 210, may cause the one or more processors to execute the function corresponding to the instruction. The computer-readable storage medium may be, for example, the memory 230.

The computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a read only memory (ROM), a random access memory (RAM), a flash memory, etc.), etc. The instruction may include code made by compiler or code that can be executed by an interpreter.

Any of the modules or programming modules according to various embodiments of the present disclosure may include at least one of the above described elements, exclude some of the elements, or further include other additional elements. The operations performed by the modules, programming module, or other elements may be executed in a sequential, parallel, repetitive, or heuristic manner. Further, some operations may be executed according to another order or may be omitted, or other operations may be added.

According to various embodiments of the present disclosure, a recording medium can include a computer-readable recording medium which stores a program for executing various methods by the processor 210.

According to various embodiments of the present disclosure, the electronic device can encompass any device using one or more of various processors such as a AP, a CP, a GPU, and a CPU. For example, the electronic device can include an information communication device, a multimedia device, a wearable device, an IoT device, or various devices corresponding to such devices.

Figure 4:
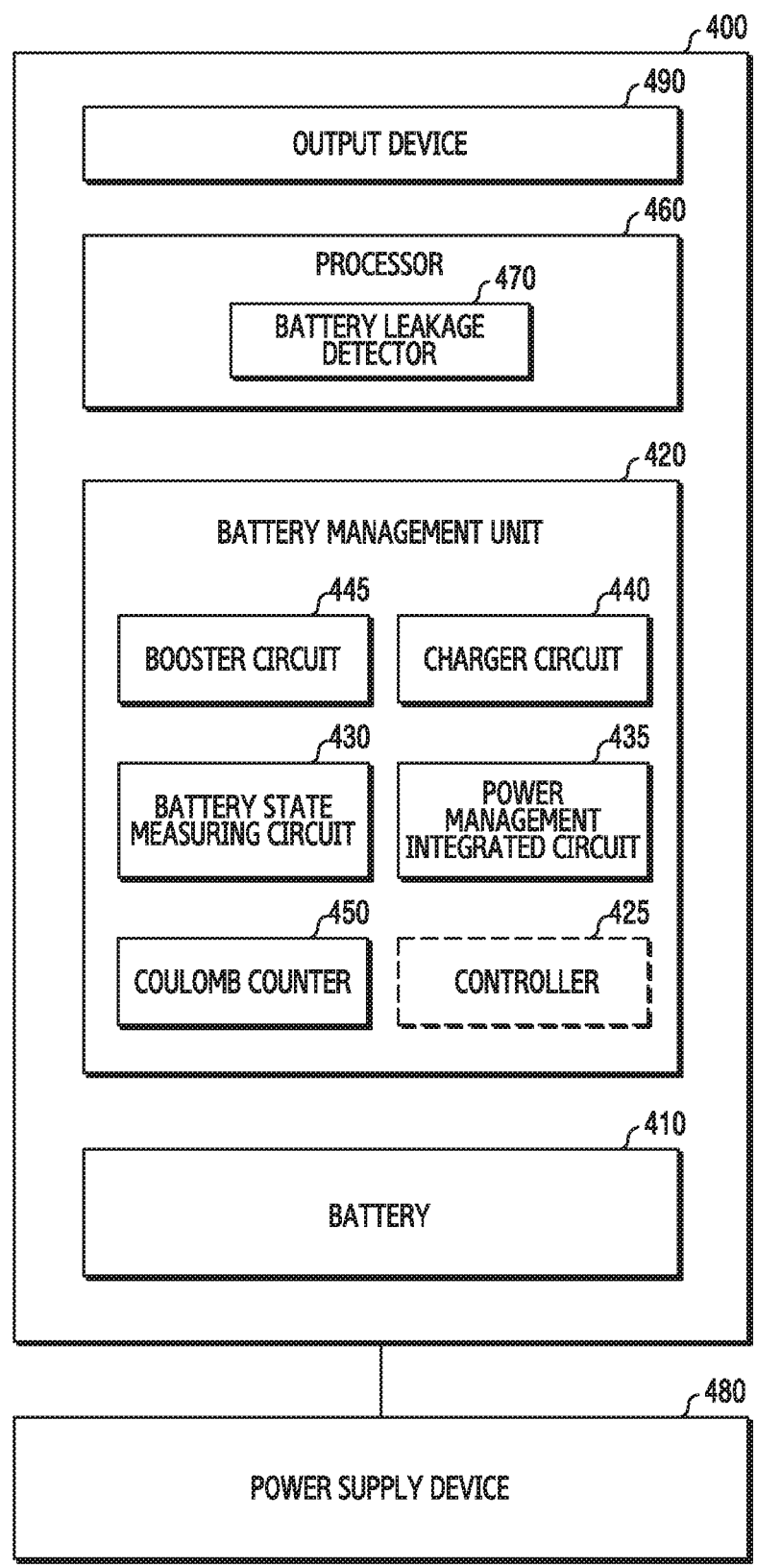
FIG. 4 illustrates a simplified diagram of a battery control configuration in an electronic device according to various embodiments of the present disclosure.

FIG. 4 illustrates a simplified diagram of a battery control configuration in an electronic device according to various embodiments of the present disclosure.

Referring to FIG. 4, an electronic device 400 can include, for example, a processor 460, a battery management unit (BMU) 420, and a battery 410. According to various embodiments of the present disclosure, the electronic device 400 can be connected to a power supply device 480 which supplies external power to the electronic device, by a wired or a wireless method. In FIG. 4, the power supply device 480 is not included in the electronic device 400 and is illustrated to ease the understanding of the present disclosure. For example, the power supply device 480 can be an external device coupled to the electronic device 400 through a preset interface.

The electronic device 400 can include a rechargeable battery 410, and the battery 410 can be charged directly with output power from the power supply device 480. According to various embodiments of the present disclosure, the battery 410 of the electronic device 400 may be charged through a separate charging device (e.g., a battery charging dock or a cradle).

The power supply device 480 can include, for example, a travel adapter (TA) or a power supply. According to various embodiments of the present disclosure, the power supply device 480 can be integrated with the charging device, or coupled to the charging device as a separate device (e.g., a charger). Hereafter, the power supply device 480 includes the charging device function.

The power supply device 480 can supply power (e.g., voltage and current) to the electronic device 400 to charge the battery 410 of the electronic device 400. The power supply device 480 can provide voltage or current at various levels. According to an embodiment of the present disclosure, the power supply device 480 can output a reference voltage or a voltage higher than the reference voltage (hereafter, referred to as a high voltage). The electronic device 400 can receive the output voltage (e.g., the reference voltage or the high voltage) from the power supply device 480 and charge the battery 410 according to the received output voltage.

In various embodiments of the present disclosure, the power supply device 480 can include a wired power supply device or a wireless power supply device. When the power supply device 480 is a wired power supply device, the power supply device 480 can be coupled to the electronic device 400 through a wired interface in the electronic device 400. When the power supply device 480 is the wireless power supply device, the power supply device 480 can be coupled to the electronic device 400 through a wireless interface (e.g., a coil).

When the power supply device 480 is connected to the electronic device 400, the power supply device 480 can provide information about the voltage or current at various levels and the current to the electronic device 400. The power supply device 480 can be a normal power supply device or a fast power supply device according to an embodiment of the present disclosure. For example, the normal power supply device can supply the power with a first voltage (e.g., 5V at 500 mA). The fast power supply device can charge the battery faster than the normal power supply device with a second voltage (e.g., 9V at 1.5 A) which is higher than the normal power supply device. When the power supply device 480 supports the fast charge mode, it can supply the first voltage or the second voltage which is higher than the first voltage to the electronic device 400. When the power supply device 480 supports the fast charge mode, it can control the output power (e.g., the first voltage or the second voltage) corresponding to a charging power requested from the electronic device 400.

In various embodiments of the present disclosure, the electronic device 400 can be charged (e.g., a wired or a wirelessly method) in association with the power supply device 480. When the power supply device 480 is connected (e.g., coupled to a connector of the power supply device 480 or mounted on a charging device (e.g., a wireless charging pad)), the electronic device 400 can be charged with the voltage supplied from the power supply device 480. The electronic device 400 can receive the power from the power supply device 480 through an electric circuit and charge the internal battery 410 with the received power.

According to various embodiments of the present disclosure, the electronic device 400 can include the battery 410, the BMU 420 (or a power management circuit, a battery control circuit, etc.), and the processor 460 (or a control circuit), for detecting the state of charge and an abnormal state (e.g., internal leakage) of the battery 410.

The battery 410 can have the same or similar structure to the battery 296. The battery 410 can be functionally or physically coupled with the power supply device 480 through various interfaces. The battery 410 can include a positive terminal and a negative terminal. The battery 410 can include, for example, a rechargeable battery and/or a solar battery. The battery 410 can be mounted inside or outside the electronic device 400. The battery 410 can be functionally or physically coupled with the electronic device 400 through various interfaces.

According to various embodiments of the present disclosure, when the power supply device 480 is connected to the electronic device 400, the BMU 420 (or the power management circuit) can recognize the power supply device 480 and notify the connection to the processor 460. The BMU 420 can have the same or similar structure as the power management module 295. The BMU 420 can be connected with the processor 460 of the electronic device 400 and thus control the battery 410 under control of the processor 460. The processor 460 can be implemented as a control circuit.

According to various embodiments of the present disclosure, the BMU 420 can include a controller 425 (e.g., a micro controller unit (MCU)) for detecting state information such as an internal failure of the battery 410 and controlling the electronic device 400 based on the state information. The BMU 420 can include a battery state measuring circuit 430 (e.g., a remaining battery capacity measuring circuit) for measuring a battery state (e.g., state of charge (SOC)) of the battery 410. The BMU 420 can include one or more charger ICs for providing charging power to the battery 410. The BMU 420 can include a PMIC 435 for charging the battery 410 and providing the power to a system load, and a booster circuit 445. The BMU 420 can include a coulomb counter 450 for continuously tracking a charge/discharge state of the battery 410.

According to various embodiments of the present disclosure, the coulomb counter 450 may be included in the battery state measuring circuit 430. When the coulomb counter 450 is included in the battery state measuring circuit 430, the battery state measuring circuit 430 can include, for example, a voltage measurement configuration and a current measurement configuration such as a voltage measurer and a current measurer. When the coulomb counter 450 is included in the battery state measuring circuit 430, the processor 460 can receive data from at least part of the voltage measurer or the current measurer and identify the SOC of the battery 410 by calculating at least part of the voltage or the current_of the battery 410 based on the received data. The current measurer of the battery state measuring circuit 430 can calculate charges accumulated in the battery 410.

According to various embodiments of the present disclosure, the BMU 420 can further include a separate switch (e.g., a field effect transistor (FET) circuit) for providing a current path from the power supply device 480 to the battery 410 or a circuit (e.g., the system load) of the electronic device 400 requiring the power.

According to various embodiments of the present disclosure, the electronic device 400 can include a switch for selectively interconnecting the battery 410 and the BMU 420 (or the power management circuit) of the electronic device 400. As at least part of measurement of first information (e.g., a first voltage) and second information (e.g., a second voltage) of the battery 410, the processor 460 can measure them by opening the battery 410 and the BMU 420 using the switch or by connecting a circuit exhibiting the equivalent effect. The processor 460 can measure an open circuit voltage (OCV) by disconnecting the battery 410 and the BMU 420, or by connecting the circuit exhibiting the equivalent effect.

The battery state measuring circuit 430 can include, for example, a battery gauge (B/G) IC. The battery state measuring circuit 430 may include the coulomb counter 450 therein. The battery state measuring circuit 430 can measure information of the battery 410. The information of the battery 410 can include the remaining capacity, a voltage, a current, and a temperature during the charging. The battery state measuring circuit 430 can measure the information of the battery 410 based on a signal received through an electric path connected to the battery 410. The battery state measuring circuit 430 can provide the measured information of the battery 410 to the processor 460.

The PMIC 435 can manage the power of the electronic device 400. The PMIC 435 can include a wired and/or wireless charging method. The wireless charging method can include, for example, a magnetic resonance method, a magnetic induction method, or an electromagnetic method, and can further include an additional circuit for the wireless charging, for example, a coil loop, a resonant circuit, or a rectifier.

A charger circuit 440 can provide the voltage applied through the booster circuit 445 or an external device (e.g., the power supply device 480) to at least one of the PMIC 435 and the battery 410.

The booster circuit 445, which is connected to the battery 410, can boost the voltage of the connected battery 410 and provide the boosted voltage to the charger circuit 440.

The coulomb counter 450 can provide the processor 460 with information about current flowing into the battery 410. According to an embodiment of the present disclosure, the coulomb counter 450 may be included in the battery state measuring circuit 430. The coulomb counter 450 can continuously track or monitor the charge/discharge state (e.g., currents used) of the battery 410, output a pulse every time a given current amount is used, and thus provide remaining capacity information of the battery 410 to the processor 460. By use of the battery state measuring circuit 430 and the coulomb counter 450, the state information (e.g., the remaining capacity of the battery 410 based on the voltage and/or the current) of the battery 410 can be provided with higher accuracy. An error (e.g., an offset) accumulated in the continuous current measurement of the coulomb counter 450 can be corrected using the voltage measurement value of the battery state measuring circuit 430. For example, the accuracy can increase more by reducing the drawback (e.g., the offset) of the coulomb method using both of the voltage and the coulomb count.

According to various embodiments of the present disclosure, the BMU 420 can include an controller 425 (e.g., a processor), and control the booster circuit 445, the charger circuit 440, the battery state measuring circuit 430, or the PMIC 435 using the controller 425. Depending on the implementation of the BMU 420, the controller 425 may be or may not be included in the BMU 420. When the BMU 420 includes the controller 425, the controller 425 can process the control operation of the processor 460 in lieu of the processor 460. For example, the controller 425 can be included in the BMU 420 and implemented as a dedicated controller (e.g., the MCU) for checking an abnormal state of the battery 410.

According to various embodiments of the present disclosure, the BMU 420 can further include an embedded memory, and store at least one state information (e.g., first state information, second state information, etc.) obtained in the charging of the battery 410 using the embedded memory. The memory for storing the state information of the battery 410 can be implemented using memory 230 or a dedicated memory embedded in the BMU 420.

The processor 460 (e.g., the control circuit) can have the same or similar structure as the processor 120 or the processor 210. According to various embodiments of the present disclosure, the processor 460 can determine the state of the battery 410 based on the information provided from the BMU 420. By determining the state of the battery 410, the processor 460 can display a UI for notification information about the battery 410 on a display of the electronic device (e.g., the display 260 of FIG. 2). The processor 460 can control the battery 410 based on the state of the battery 410. A user of the electronic device 400 can confirm the UI in relation to the state of the battery 410, and the processor 460 can control the battery 410 according to a command input from the user.

According to various embodiments of the present disclosure, through the BMU 420, the processor 460 can determine a full charge state of the battery 410 by periodically checking SOC information of the battery state measuring circuit 430, the charging current, or a full interrupt (e.g., full status information) of the charger circuit 440. When the battery 410 is fully charged, the processor 460 can control the BMU 420 to receive the power for the electronic device 400 from the power supply device 480, rather than the power from the battery 410. The electronic device 400 may control the power supply through a switch circuit (e.g., an FET circuit) based on the input voltage. The electronic device 400 may control the switch circuit with an electric signal based on the control of the processor 460.

According to various embodiments of the present disclosure, based on at least part of the battery state measuring circuit 430 and/or the coulomb counter 450, the processor 460 can obtain voltage information and/or current information of the battery 410, and determine whether there is leakage in the battery 410 based on the obtained information. The processor 460 can include a battery leakage detector 470 for detecting the leakage in the battery 410. Based on at least part of the voltage or the current of the battery 410, the processor 460 can detect the current leakage in the battery 410 and output its notification information to the user. Upon detecting the leakage of the battery 410, the processor 460 can change the state of the battery 410 based on at least one preset control algorithm.

Figure 5:
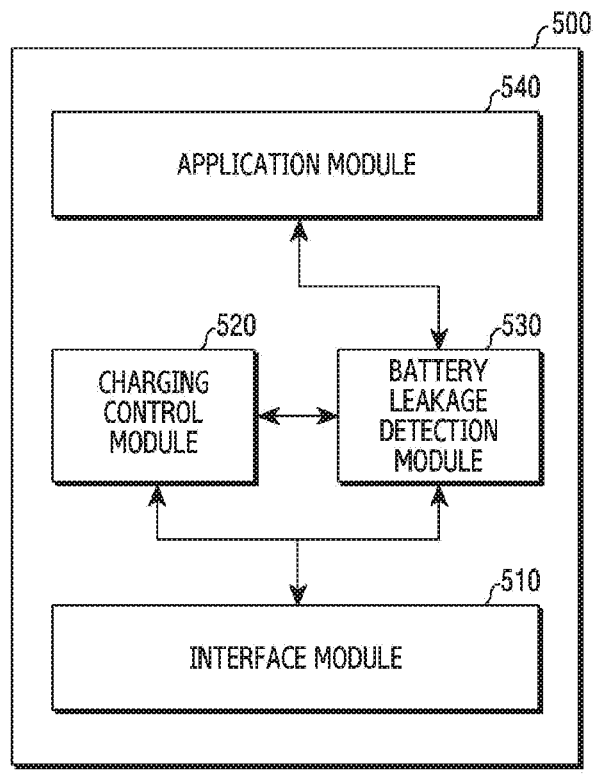
FIG. 5 illustrates a software module for battery control in an electronic device according to various embodiments of the present disclosure.

FIG. 5 illustrates a software module for battery control in an electronic device according to various embodiments of the present disclosure.

Referring to FIG. 5, the software module 500 can include, for example, an interface module 510, a charging control module 520 (e.g., the power manager 345 of FIG. 3), a battery leakage detection module 530, and an application module 540 (e.g., the application 370 of FIG. 3).

The interface module 510 can have the same or similar configuration to the kernel 141 or the device driver 323. The interface module 510 can indicate, for example, a driver module for interfacing logics (e.g., the battery state measuring circuit 430, the charger circuit 440, the coulomb counter 450, etc.) of the BMU 420.

The charging control module 520 can have the same or similar configuration to the power manager 345. The charging control module 520 can control, for example, the supply the charging current to the battery 410 (e.g., the battery 295 of FIG. 2).

The battery leakage detection module 530 (e.g., the battery leakage detector 470 of the processor 460) can be a module for detecting and determining the internal leakage of the battery 410 based on at least part of the voltage information or the current information of the battery state measuring circuit 430 and/or the coulomb counter 450.

The application module 540 can have the same or similar configuration to the applications 147 or the applications 370. The application module 540 can indicate a module for outputting notification information to the user through a preset UI based on the leakage detected by the battery leakage detection module 530.

An electronic device according to various embodiments of the present disclosure includes a battery, a charger circuit for charging the battery, a measurement circuit (e.g., a BMU 420, a power management circuit, a battery state measuring circuit 430, a coulomb counter 450) for checking a state of the battery, and a processor (e.g., a processor 460, a controller 425, etc.). The processor or controller can be configured to charge the battery using the charger circuit, to determine whether the charging operation satisfies a preset condition, when the charging operation satisfies the preset condition, to obtain first state information of the battery using the measurement circuit, to determine an abnormal state of the battery at least based on a difference between the first state information and second state information which is obtained when the preset condition is satisfied before the first state information is acquired, and to output notification information regarding the abnormal state.

According to various embodiments of the present disclosure, the processor can obtain a first capacity of the charged battery, as at least part of the first state information, and obtain a second capacity of the battery previously charged, as at least part of the second state information.

According to various embodiments of the present disclosure, the processor can determine whether the battery is charged up to a maximum capacity, as at least part of the preset condition, and stop the charging operation when the battery is charged up to the maximum capacity.

According to various embodiments of the present disclosure, after a preset time from the stopped charging operation, the processor can measure a first voltage of the battery as at least part of the second state information, and, after another preset time from the first voltage measurement, measure a second voltage of the battery as at least part of the first state information.

According to various embodiments of the present disclosure, the electronic device can further include a power management circuit, and a switch for selectively connecting the battery and the power management circuit. The processor can open the battery and the power management circuit using the switch, as at least part of the measurement of the first voltage and the second voltage.

According to various embodiments of the present disclosure, the management circuit can include a circuit for measuring the voltage of the battery, a circuit for measuring a remaining capacity of the battery, a circuit for measuring an amount of an electrical charge which is input and output to and from the battery, or a combination of the circuits.

According to various embodiments of the present disclosure, when determining the abnormal state during the battery charge, the processor can store the battery charging.

According to various embodiments of the present disclosure, the processor can determine the abnormal state when a difference of a value corresponding to the second state information and a value corresponding to the first state information exceeds a preset reference value.

According to various embodiments of the present disclosure, when the battery switches from the abnormal state to a normal state, the processor can resume the battery charging.

According to various embodiments of the present disclosure, the processor can send at least part of the notification information to an external electronic device functionally connected with the electronic device, as at least part of the notification information output operation.

According to various embodiments of the present disclosure, the electronic device can further include a memory for storing the first state information or the second state information.

An electronic device according to various embodiments of the present disclosure includes a battery, a charger circuit for charging the battery, a measurement circuit (e.g., a BMU 420, a power management circuit, a battery state measuring circuit 430, a coulomb counter 450, etc.) for checking a state of the battery, and a processor. The processor or controller can be configured to charge the battery 410 using the charger circuit, after charging the battery, to measure a first voltage and a second voltage with no current supplied from the battery to the electronic device, the first voltage and the second voltage measured at different times respectively, to determine an abnormal state of the battery based on at least the first voltage and the second voltage, and to provide notification information of the abnormal state through an output device.

According to various embodiments of the present disclosure, the processor can determine whether the battery is charged up to a maximum capacity, as at least part of a preset condition, and control to stop the charging operation when the battery is charged up to the maximum capacity.

According to various embodiments of the present disclosure, the processor can, after a preset time from the stopped charging operation, measure the first voltage of the battery, and after another preset time from the first voltage measurement, measure the second voltage of the battery.

According to various embodiments of the present disclosure, the electronic device can further include a power management circuit, and a switch for selectively connecting the battery and the power management circuit. The processor can open the battery and the power management circuit using the switch, as at least part of the measurement of the first voltage and the second voltage.

In various embodiments of the present disclosure described below, a hardware approach will be described according to an embodiment. However, since the embodiments of the present disclosure include the use of both hardware and software, the present disclosure does not exclude a software-based approach.

Figure 6A:
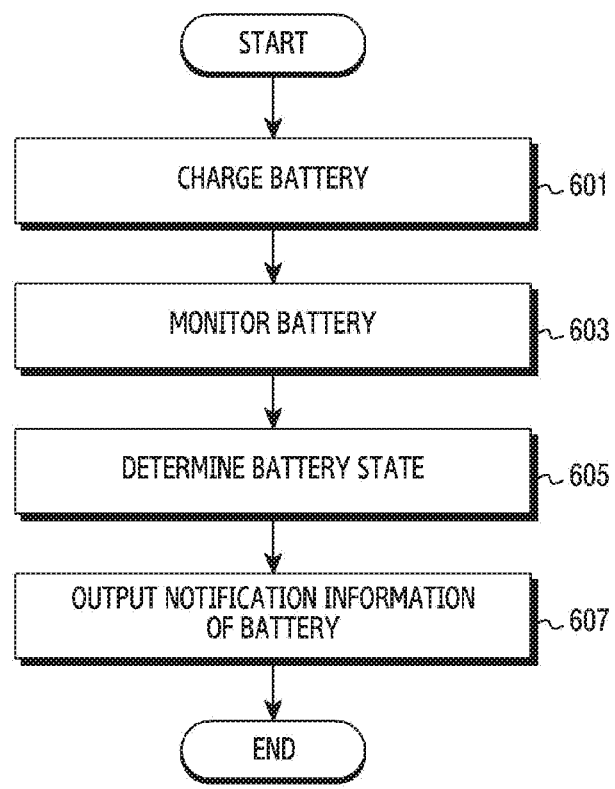
FIG. 6A illustrates a flowchart for providing a battery state in an electronic device according to various embodiments of the present disclosure.

FIG. 6A illustrates a flowchart for providing a battery state in an electronic device according to various embodiments of the present disclosure.

Referring to FIG. 6A, in operation 601, the processor 460 (or the processor 120 or 210 of FIG. 1 or FIG. 2, the controller 425 of FIG. 4) of the electronic device 400 can charge the battery 410. The processor 460 can charge the battery 410 up to a preset capacity. The preset capacity can be defined based on at least a preset charge capacity (e.g., 80%, 90%, etc.), a full capacity, a full voltage, or an end of charge current.

In operation 603, the processor 460 can monitor a state of the battery 410 during the charge. The processor 460 can monitor the battery 410 based on state information (e.g., voltage information and/or current information) of the battery 410 acquired through the BMU 420 (e.g., the power management module 295).

The processor 460 can determine whether the charging of the battery 410 satisfies a preset condition. For example, the processor 460 can determine whether the battery 410 is charged up to the preset capacity (e.g., the preset charge capacity, the full capacity, the full voltage, or the end of charge current). When the charging satisfies the preset condition, the processor 460 can obtain first information of the battery 410. The processor 460 can monitor the battery state based on various battery state detection methods.

In operation 605, the processor 460 can determine the battery state based on the monitoring result. When acquiring the first information, the processor 460 can identify second information obtained when the preset condition is satisfied before the first information is obtained. The processor 460 can determine a difference between a value corresponding to the second information and a value corresponding to the first information. The processor 460 can determine the state of the battery 410 based on the determined difference. When the difference of the second information and the first information exceeds a preset reference, the processor 460 can determine an abnormal state of the battery 410. When the difference of the second information and the first information does not exceed the preset reference, the processor 460 can determine a normal state of the battery 410.

In operation 607, the processor 460 can output notification information regarding the battery 410 based on at least the state of the battery 410. Upon determining the abnormal state of the battery 410, the processor 460 can output the notification information through an output device 490 (e.g., the display 160 or 260, the speaker 282, etc.) of the electronic device 400. The processor 460 may transmit the notification information to an external electronic device such as a wearable device (e.g., a watch), or electronic device 102 or 104, etc. functionally coupled with the electronic device 400. The processor 460 may transmit the notification information to an external device (e.g., the server 106, a manufacturer's server, a provider server, etc.) functionally coupled with the electronic device 400 and thus notify a user about an emergency due to the battery 410 of the electronic device 400.

According to various embodiments of the present disclosure, at least one of operations 601 through 607 can be executed by the BMU 420 under the control of the processor 460 or independently. When the BMU 420 includes the controller 425, the BMU 420 may execute at least one of operations 601 through 607 based on the controller 425.

Figure 6B:
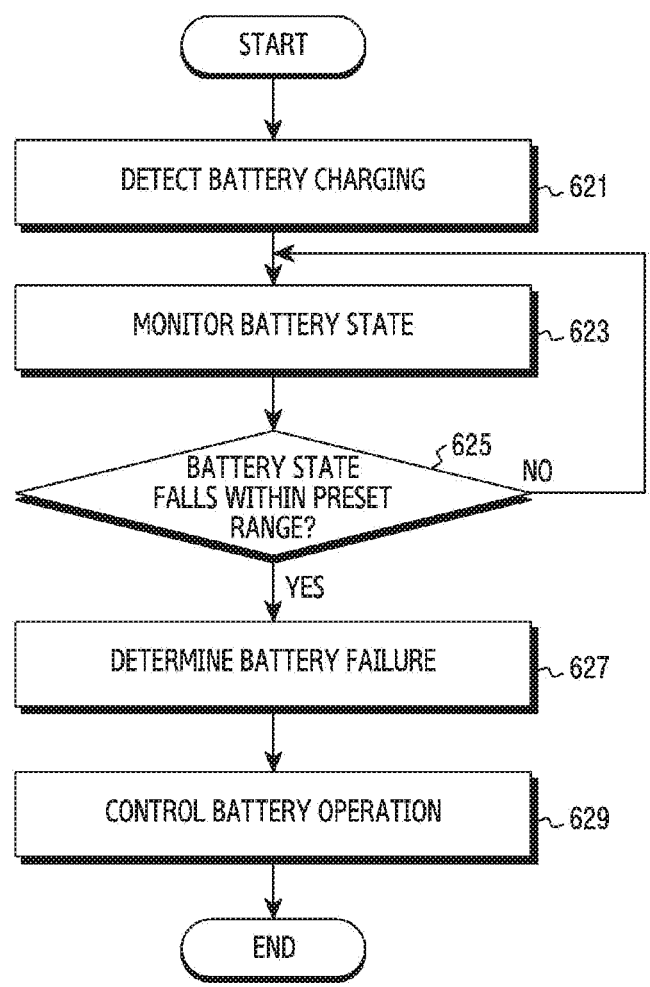
FIG. 6B illustrates a flowchart of battery control operations in an electronic device according to various embodiments of the present disclosure.

FIG. 6B illustrates a flowchart of battery control operations in an electronic device according to various embodiments of the present disclosure.

Referring to FIG. 6B, in operation 621, the processor 460 (or the processor 120 or 210 of FIG. 1 or FIG. 2, the controller 425 of FIG. 4) of the electronic device 400 can detect an SOC of the battery 410. Based on information acquired by the BMU 420 (e.g., the power management module 295), the processor 460 can determine a connection state of the power supply device 480. In response to the connection of the power supply device 480, the processor 460 can control the BMU 420 to charge the battery 410.

In operation 623, the processor 460 can monitor a state of the battery 410 during the charging of the battery 410. The processor 460 can monitor a failure (e.g., leakage) of the battery 410 based on the state information (e.g., the voltage information and/or current information of the battery 410) acquired through the BMU 420 (e.g., the power management module 295). The processor 460 can monitor the battery state based on various battery failure detection methods.

According to an embodiment of the present disclosure, the processor 460 can monitor and detect a battery failure (e.g., a failure due to an internal short) based on a first method (e.g., a coulomb count (QH) method). For example, the processor 460 can measure the capacity (e.g., the QH) of the battery 410 with the coulomb counter 450, and determine whether the battery 410 has a failure based on a difference between at least two capacities measured at different times. The capacity of the battery 410 can indicate the battery capacity accumulated from a previous capacity (e.g., 3.6V) to a corresponding time point.

According to an embodiment of the present disclosure, the processor 460 can monitor and detect a battery failure (e.g., leakage) using a second method (e.g., a voltage drop (e.g., OCV) method). For example, the processor 480 can charge the battery 410 up to a preset capacity (e.g., the full capacity, the full voltage, or the end of charge current), and then determine whether the battery 410 has a failure based on a variance of voltages measured at different times.

In operation 625, the processor 460 can determine whether the monitoring result of the battery 410 falls within a preset range. The processor 460 can determine whether a difference of the capacity charged to the battery according to the first method falls within the preset range. The processor 460 can determine whether the voltage variance according to the second method falls within the preset range.

When the monitoring result of the battery 410 does not fall within the preset range in operation 625, the processor 460 can return to operation 623.

When the monitoring result of the battery 410 falls within the preset range in operation 625, the processor 460 can determine the failure of the battery 410 in operation 627. According to an embodiment of the present disclosure, the processor 460 can determine current leakage of the battery 410.

In operation 629, the processor 460 can control the operation of the battery 410 in response to the battery failure. The processor 460 can process to output notification information. The processor 460 can process to turn off the electronic device 400. The processor 460 can determine the battery control method based on a type of the battery failure, and control to change the state of the battery 410 based on the determined control method.

According to various embodiments of the present disclosure, at least one of operations 621 through 629 can be executed by the BMU 420 under the control of the processor 460 or autonomously. When the BMU 420 includes the controller 425 (e.g., the processor), it may autonomously execute at least one of operations 621 through 629 based on the controller 425.

Figure 7:
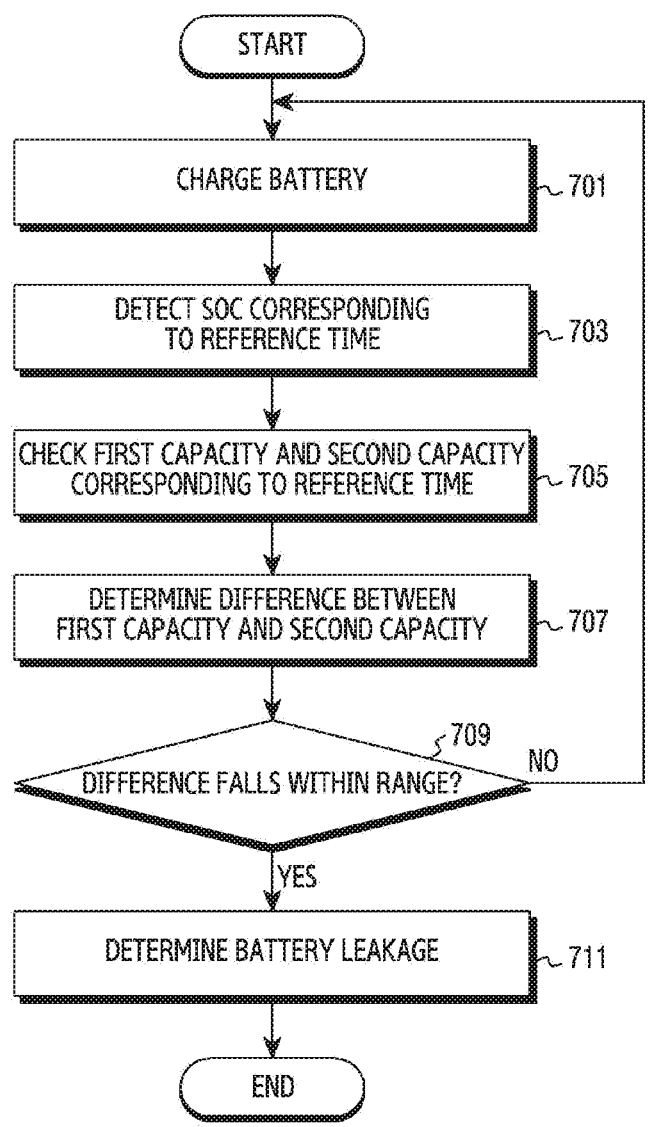
FIG. 7 illustrates a flowchart for detecting a battery state in an electronic device according to various embodiments of the present disclosure.

FIG. 7 illustrates a flowchart for detecting a battery state in an electronic device according to various embodiments of the present disclosure.

In various embodiments of the present disclosure, operations for detecting a battery failure may be based on the first method (e.g., the QH method).

Referring to FIG. 7, in operation 701, the processor 460 (or the processor 120 or 210 of FIG. 1 or FIG. 2, the controller 425 of FIG. 4) of the electronic device 400 can charge the battery 410. The processor 460 can charge the battery 410 with power supplied from the power supply device 480 by a wired or a wireless method.

In operation 703, the processor 460 can detect an SOC of the battery 410 corresponding to a reference time. For example, when charging the battery 410 commences, the processor 460 can determine a time reaching a preset reference voltage, as the reference time and determine the SOC of the battery 410 at the reference time. When the reference voltage is set to the full charge and the battery 410 commences the charging, the processor 460 can monitor the SOC of the battery 410 and thus determine the full charge (e.g., the reference time) of the battery 410.

In operation 705, the processor 460 can check a capacity of the battery 410 at the reference time. The processor 460 can charge the battery 410 up to the reference time, for example, up to a preset capacity (e.g., a reference voltage, a full capacity, a full voltage, or an end of charge current) for checking the state of the battery 410, and store the capacity of the battery 410 in association with the reference time. The preset capacity can indicate, for example, the SOC of the battery 410 after the correction based on voltage information and various information. The processor 460 can obtain and store a first capacity (e.g., a capacity measured after a previous full charge) at a first time (e.g., a first full charge time after the charge), and obtain and store a second capacity (e.g., a capacity measured at a current full charge) at a second time (e.g., a second full charge time after the discharge).

In operation 707, the processor 460 can determine a difference between the first capacity and the second capacity. The processor 460 can calculate a difference value with the battery capacities (e.g., the difference between the first capacity and the second capacity) measured at the reference time.

In operation 709, the processor 460 can determine whether the difference between the first capacity and the second capacity falls within a preset range. The processor 460 can determine whether the difference value of the first capacity and the second capacity exceeds a preset reference value.

When the capacity difference does not fall within the present range in operation 709, the processor 460 can go back to operation 701.

When the capacity difference falls within the present range in operation 709, the processor 460 can determine a failure of the battery 410 in operation 711. For example, the processor 460 can determine leakage of the battery 410.

According to various embodiments of the present disclosure, the BMU 420 can execute at least one of operations 701 through 711 under the control of the processor 460 or by itself. When the BMU 420 includes the controller 425, it may autonomously execute at least one of operations 701 through 711 based on the controller 425.

Figure 8:
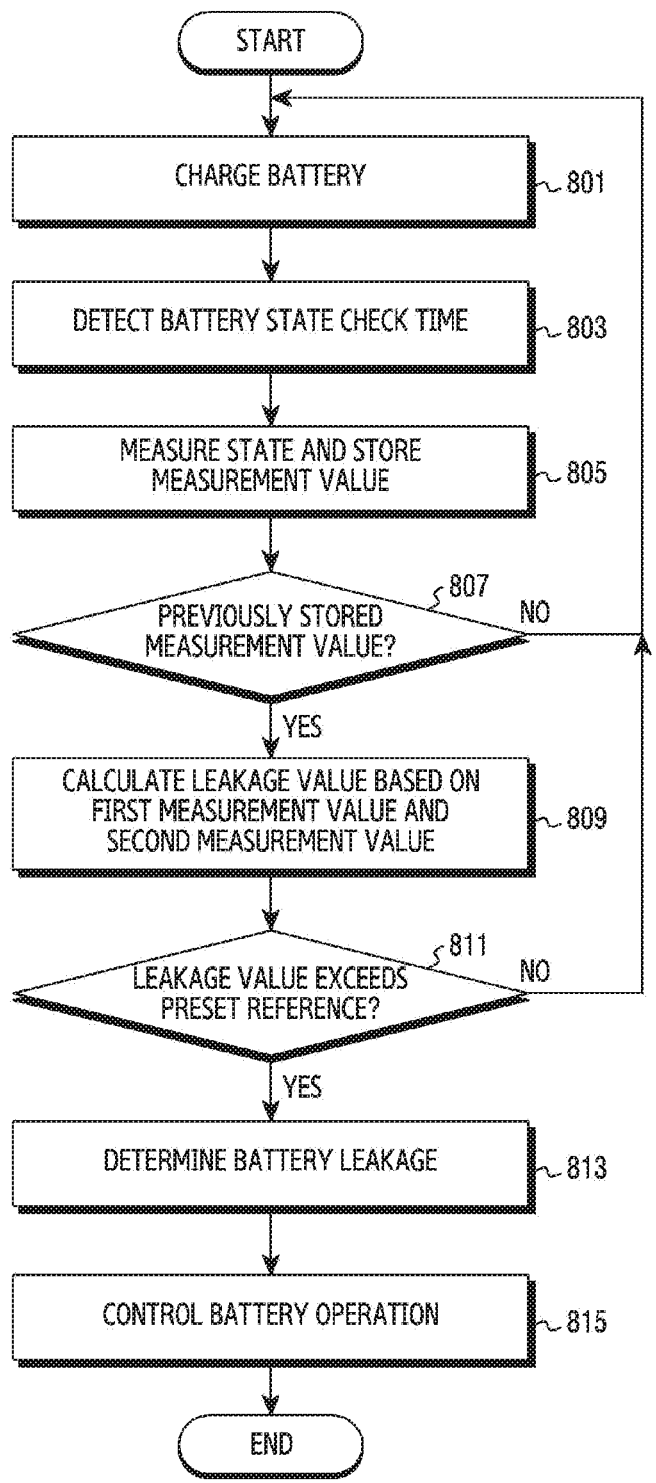
FIG. 8 illustrates a flowchart for detecting a battery state and controlling a battery in an electronic device according to various embodiments of the present disclosure.
Figure 9:
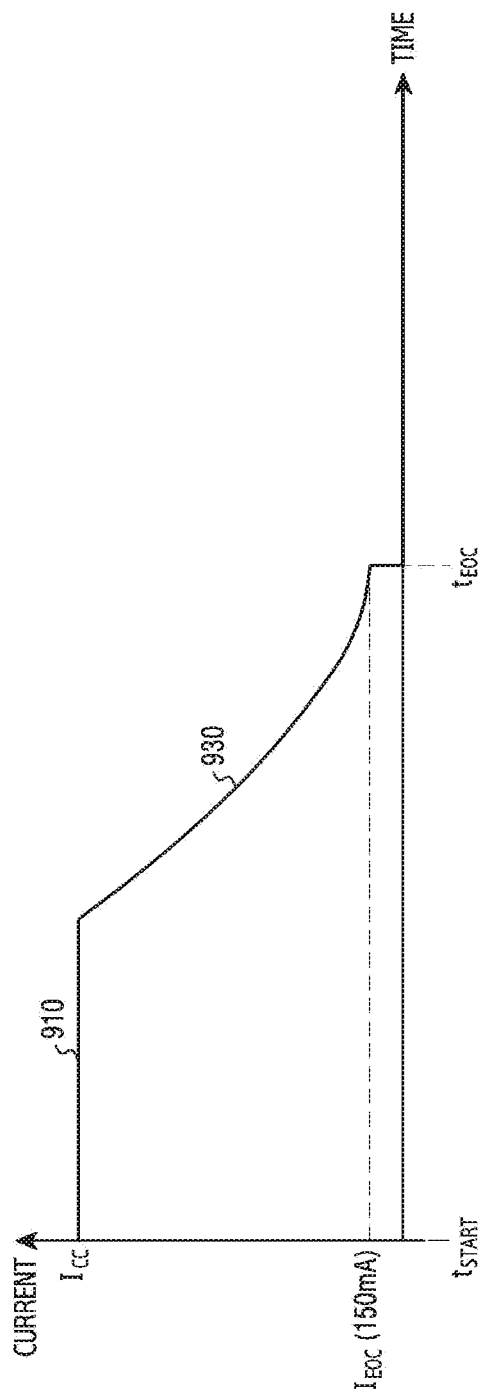
FIGS. 9 and 10 illustrate graphs of battery state detection in an electronic device according to various embodiments of the present disclosure.
Figure 10:
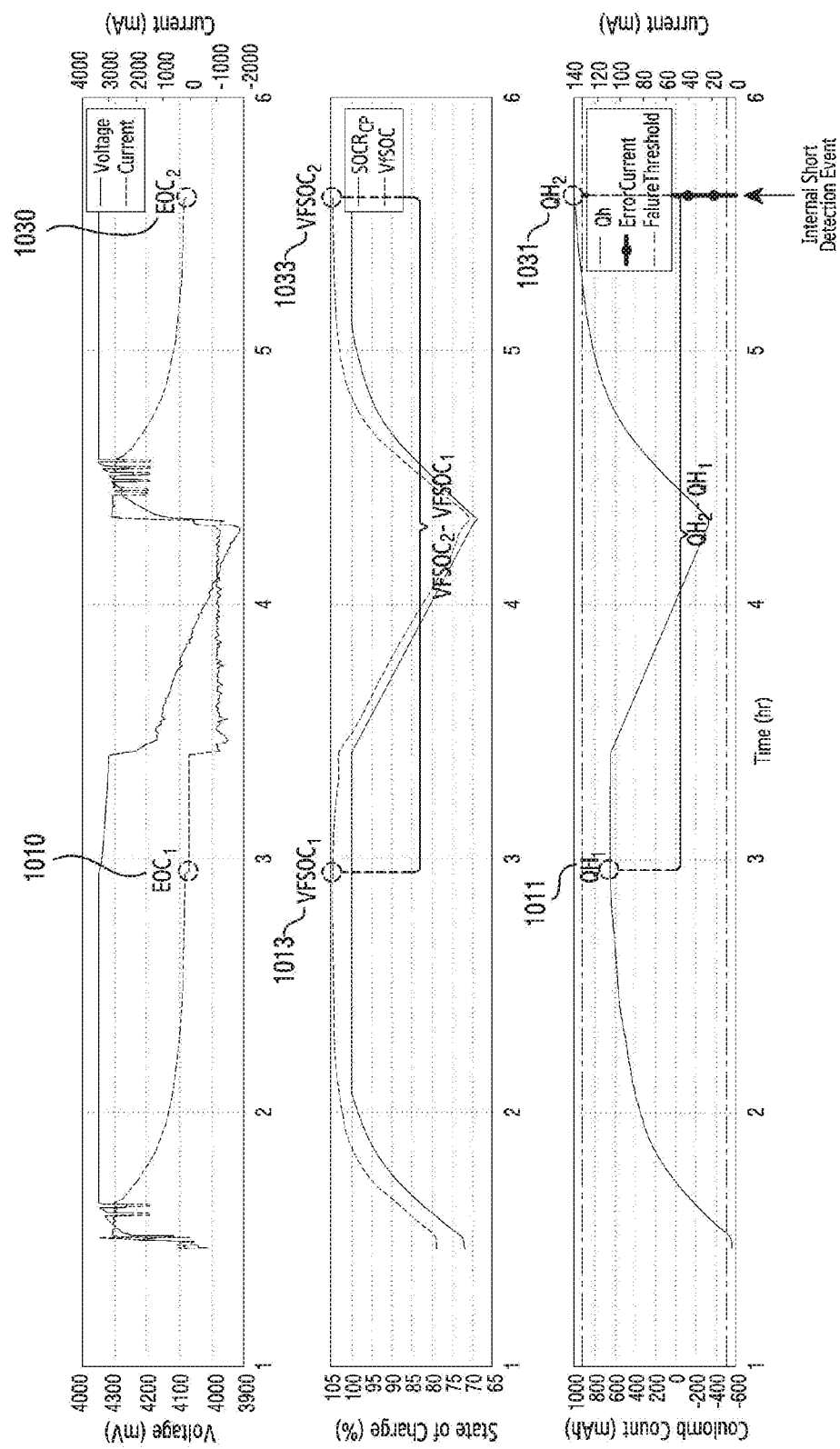

FIG. 8 illustrates a flowchart of a method for detecting a battery state and controlling a battery in an electronic device according to various embodiments of the present disclosure. FIGS. 9 and 10 illustrate battery state detection graphs in an electronic device according to various embodiments of the present disclosure.

FIGS. 8, 9, and 10 illustrate operations for detecting a battery failure based on the first method (e.g., the QH method) and controlling a battery state in response to the detected battery failure.

Referring to FIG. 8, in operation 801, the processor 460 of the electronic device 400 can charge the battery 410.

In operation 803, the processor 460 can detect a battery state check time (e.g., a reference time). FIG. 9 illustrates a variance in terms of a charge current. As shown in FIG. 9, when the charge of the battery 410 begins, a constant current (CC) interval 910 (e.g., a straight interval on the graph where a high charge current is maintained) continues for a certain amount time. Near a full voltage (e.g., $I_{CC}$), the battery 410 enters a constant voltage (CV) interval 930 (e.g., a downward curve interval on the graph where the charge current declines). The charging is completed at an end of charge current ($t_{EOC}$) and the supply of the charge current can be cut off After entering the CV interval in the battery charging, the processor 460 can determine whether a variance of the charge current of the battery 410 falls within a certain reference. The processor 460 can set a time when the battery 410 reaches the full charge, gets close to the full voltage, or reaches a preset voltage, as the battery state check time. The processor 460 can measure the QH at every battery state check time and determine an internal short based on a difference value of the measured QH values.

Referring back to FIG. 8, in operation 805, the processor 460 by detecting the battery state check time can measure the state of the battery 410 and store a measurement value. In response to the detected battery state check time (e.g., a first time), the processor 460 can measure the state of the battery 410 (e.g., the charge capacity of the battery 410, hereafter, QH) and store the measured QH value (e.g., a first measurement value, a first QH value, a first capacity, etc.). The processor 460 can store the first time when the charge current (or the voltage of the battery 410) is full (e.g., reaches the end of charge current) and the first QH value of the first time. The processor 460 can calculate the QH value when the charge current or the battery voltage of the fully charged battery 410 is stabilized.

In operation 807, the processor 460 can determine whether there exists a previously stored battery state measurement value (e.g., a QH value). The processor 460 can determine whether there exists the previous QH value measured and stored at a previous battery state check time. The previous QH value can be used as a reference QH value to compare the measured QH value at the current battery state check time.

When there is no previous battery state measurement value (e.g., the previous QH value) in operation 807, the processor 460 returns to operation 801. After the battery 410 is discharged naturally or after the user uses the electronic device 400, the battery 410 can be recharged and the processor 460 can measure the state of the battery 410 at the battery state check time. After the battery 410 is charged, the processor 460 can perform the full charge or auxiliary charge after the full charge, and measure and store the QH value based on a particular time (e.g., the battery state check time) of the full charge after the auxiliary charge.

When determining the previously stored battery state measurement value (e.g., a second measurement value, a second QH value, a second capacity, etc.) in operation 807, the processor 460 can calculate a leakage value based on the first measurement value (or the first QH value, the first capacity, etc.) and the second measurement value (or the second QH value, the second capacity, etc.) in operation 809. The processor 460 can calculate the leakage value with a difference between the first QH value and the second QH value based on time. Equation (1) and Equation (2) can calculate the leakage value.

$$\text{Leakage} = \frac{(QH_2 - QH_1)}{\Delta t} \quad (1)$$

As shown in Equation (1), the leakage value can be calculated with at least two measurement values (e.g., the first QH value and the second QH value). The leakage value may be calculated by considering the SOC and the full capacity (FullCap) of the battery 410 as expressed in Equation (2).

$$\text{Leakage} = \frac{[(QH_2 - QH_1) - (VFSOC_2 - VFSOC_1) * FullCap]}{(t_2 - t_1)} \quad (2)$$

In Equation (2), FullCap can indicate an SOC reference capacity of the battery 410 in consideration of at least one of the QH, the temperature, the voltage, and battery degradation. According to an embodiment of the present disclosure, FullCap can be provided from the battery state measuring circuit 430, determined based on actual currents from the discharge state to the full voltage, and determine an SOC value (e.g., an internal capacity of the battery 410) of the electronic device.

As shown in FIG. 10, before the charge current of the battery 410 arrives to the end of charge current (EOC) at the first charge time, the processor 460 can measure the first capacity (e.g., the first QH value or $QH_1$) 1011 and the first SOC value $SOC_1$ 1013 at the time (e.g., $EOC_1$) 1010 reaching a preset voltage/charge current. The processor 460 can measure the second capacity (e.g., the second QH value or $QH_2$) 1031 and the second SOC value $SOC_2$ 1033 at the time (e.g., $EOC_2$) 1030 reaching the same voltage/charge current as the first charge time at the second charge time (e.g., the recharge).

The processor 460 can calculate the measured second capacity (e.g., $QH_2$ or $SOC_2$) and first capacity (e.g., $QH_1$ or $SOC_1$) based on Equation (2). When the calculated result value exceeds a certain reference, the processor 460 can determine overcharge due to the internal leakage.

Referring to FIG. 8, in operation 811, the processor 460 can determine whether the calculated leakage value exceeds a preset reference. The processor 460 can compare the calculated leakage value with the preset reference, and determine the battery leakage based on whether the calculated leakage value exceeds the reference.

When the calculated leakage value does not exceed the preset reference in operation 811, the processor 460 can return to operation 801.

When the calculated leakage value exceeds the preset reference in operation 811, the processor 460 can determine the battery leakage in operation 813. When the calculated leakage value exceeds the preset reference, the processor 460 can determine an internal short of the battery 410.

In response to the battery leakage, the processor 460 can control the battery 410 in operation 815. The processor 460 can process to output notification information. The processor 460 can turn off the electronic device 400. The processor 460 can determine the battery control method based on the type of the battery failure and change the state of the battery 410 based on the determined control method.

Figure 11A:
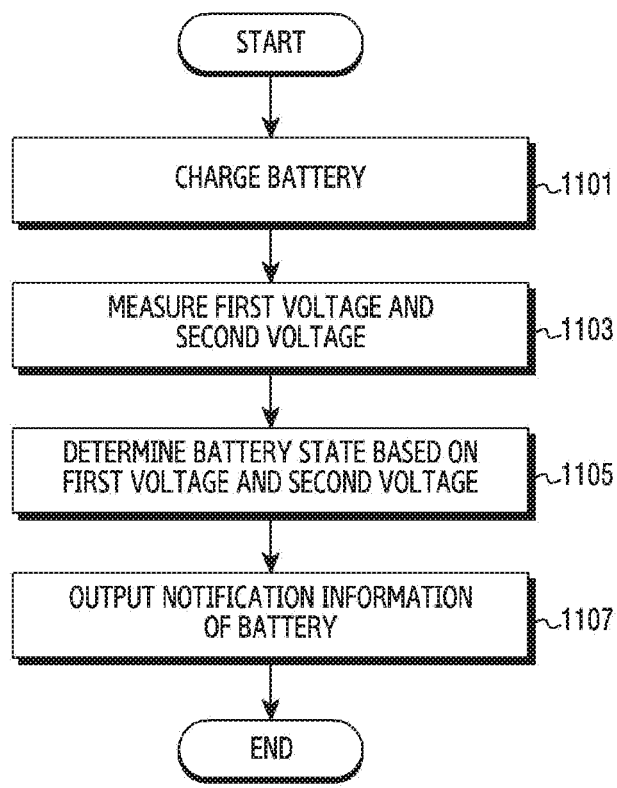
FIG. 11A illustrates a flowchart for detecting a battery state in an electronic device according to various embodiments of the present disclosure.

FIG. 11A illustrates a flowchart for detecting a battery state in an electronic device according to various embodiments of the present disclosure.

Referring to FIG. 11A, in operation 1101, the processor 460 (or the processor 120 or 210 of FIG. 1 or FIG. 2, the controller 425 of FIG. 4) of the electronic device 400 can charge the battery 410. The processor 460 can charge the battery 410 up to a preset capacity. The preset capacity may be defined based on a preset charge capacity (e.g., 80%, 90%, etc.), a full capacity, a full voltage, or an EOC.

In operation 1103, the processor 460 can measure a first voltage and a second voltage during the charging of the battery 410. The processor 460 can measure the first voltage and the second voltage of the battery 410 based on state information (e.g., voltage information and/or current information) of the battery 410 received through the BMU 420. After charging the battery 410, the processor 460 can measure the first voltage and the second voltage without current supplied from the battery 410 to the electronic device 400. As at least part of the measurement of the first voltage and the second voltage of the battery 410, the processor 460 can measure the first voltage and the second voltage by opening the battery 410 and the BMU 420 using a switch circuit (e.g., an FET circuit), or by connecting an equivalent circuit. The processor 460 can measure an OCV by opening the battery 410 and the BMU 420, or by connecting the equivalent circuit. The first voltage and the second voltage can be measured at different times. The processor 460 can determine whether the battery 410 is charged up to its maximum capacity, and stop the charging when the battery 410 is charged up to the maximum capacity. After a preset time from of ending the charging of the battery 410, the processor 460 can measure the first voltage of the battery 410 and measure the second voltage of the battery 410 after another preset time from the first voltage measurement.

In operation 1105, the processor 460 can determine a state of the battery 410 based on the first voltage and the second voltage. When a difference of the first voltage and the second voltage exceeds a preset reference, the processor 460 can determine an abnormal state of the battery 410. When the difference of the first voltage and the second voltage does not exceed the preset reference, the processor 460 can determine a normal state of the battery 410.

In operation 1107, the processor 460 can output notification information about the battery 410 at least based on the state of the battery 410. Upon determining the abnormal state of the battery 410, the processor 460 can output the notification information through an output device (e.g., the display 160 or 260, the speaker 282, etc.) of the electronic device 400. The processor 460 may transmit the notification information to an external electronic device such as a wearable device (e.g., a watch), or electronic device 102 or 104 functionally coupled with the electronic device 400. The processor 460 may transmit the notification information to an external device (e.g., the server 106, a manufacturer's server, a provider server, etc.) functionally coupled with the electronic device 400 and thus notify a user about an emergency due to the battery 410 of the electronic device 400.

According to various embodiments of the present disclosure, at least one of operations 1101 through 1107 can be executed by the BMU 420 under the control of the processor 460 or by itself. When the BMU 420 includes the controller 425, it may autonomously execute at least one of operations 1101 through 1107 based on the controller 425.

Figure 11B:
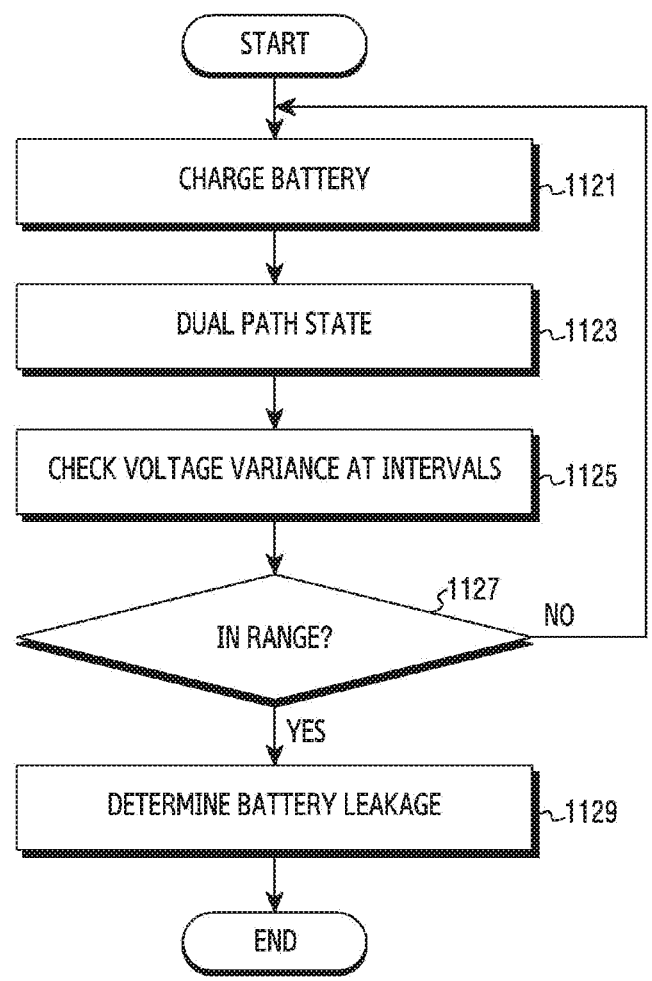
FIG. 11B illustrates a flowchart for detecting a battery state in an electronic device according to various embodiments of the present disclosure.

FIG. 11B illustrates a flowchart for detecting a battery state in an electronic device according to various embodiments of the present disclosure.

In various embodiments of the present disclosure, FIG. 11B illustrates operations for determining a battery failure based on the second method (e.g., the voltage drop method).

Referring to FIG. 11B, in operation 1121, the processor 460 (or the processor 120 or 210 of FIG. 1 or FIG. 2, the controller 425 of FIG. 4) of the electronic device 400 can charge the battery 410. The processor 460 can charge the battery 410 with power supplied from the power supply device 480 by a wired or a wireless method.

In operation 1123, the processor 460 can determine a dual path state. When measuring the state of the battery 410, the processor 460 can measure an OCV of the battery 410. The OCV measurement can check just the voltage of the battery 410 with a disconnected or open path for supplying a load required by a system load connected to the battery 410, for example, by at least one internal component connected to the battery 410. Even with the connected path for supplying the load required by the system load connected to the battery 410, the processor 460 may calculate the voltage of the battery 410 by correcting the current discharge state to yield an equivalent effect.

In operation 1125, the processor 460 can check a voltage variance at intervals in the dual path state. The processor 460 can charge the battery 410 up to a preset capacity and then obtain and store the voltage of the battery 410 without the current supply from the battery 410 to the system load of the electronic device 400. The processor 460 can measure and store a first voltage (e.g., an OCV value) at a first time (e.g., at the full charge time or after a certain time (e.g., 30 minutes) from the full charge) after the full charge of the battery 410. The processor 460 can measure the first voltage on an assumption that a phantom voltage (ghost voltage) disappears in a certain time (e.g., 30 minutes) after the full charge. At the full charge, the processor 460 can confirm the cut-off of the charge current at the full charge and calculate the first voltage by correcting a certain voltage (e.g., 0.2V) matching the phantom voltage pre-calculated to correct the phantom voltage applied to the battery 410.

After measuring the first voltage, the processor 460 can measure and store a second voltage (e.g., an OCV value) at a second time (e.g., a time after the first time at the preset interval). The processor 460 can obtain a voltage variance based on a difference between the first voltage and the second voltage of the different times (e.g., the first time and the second time).

In operation 1127, the processor 460 can determine whether the difference between the first voltage and the second voltage falls within a preset range. The processor 460 can determine whether the difference value between the measured voltage values (e.g., the first voltage and the second voltage) of the different times falls within the preset range.

When the voltage difference does not fall within the preset range in operation 1127, the processor 460 can return to operation 1121.

When the voltage difference falls within the preset range in operation 1127, the processor 460 can determine a failure of the battery 410 in operation 1129. For example, the processor 460 can determine leakage of the battery 410.

According to various embodiments of the present disclosure, the BMU 420 can execute at least one of operations 1121 through 1129 under the control of the processor 460 or by itself. When the BMU 420 includes the controller 425, it may autonomously execute at least one of operations 1121 through 1129 based on the controller 425.

Figure 12:
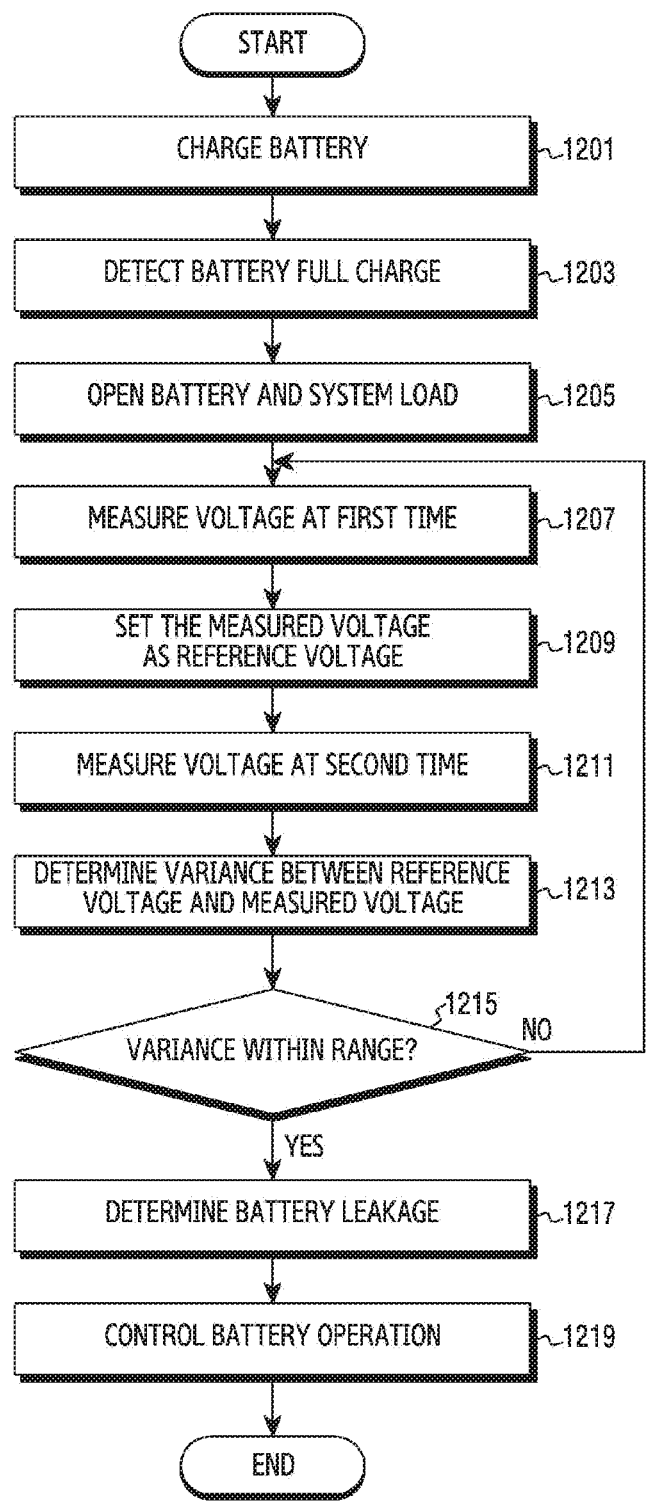
FIG. 12 illustrates a flowchart for detecting a battery state and controlling a battery in an electronic device according to various embodiments of the present disclosure.
Figure 13A:
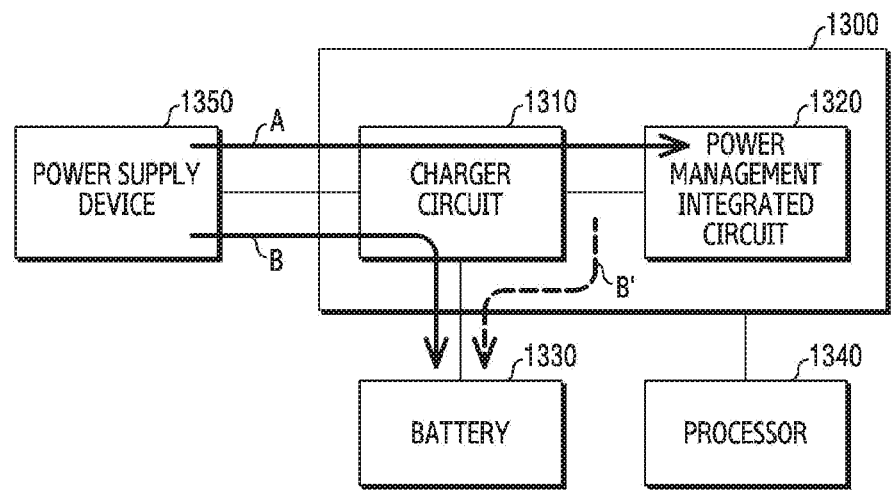
FIGS. 13A and 13B illustrate current flows in a circuit in an electronic device according to the present disclosure.
Figure 13B:
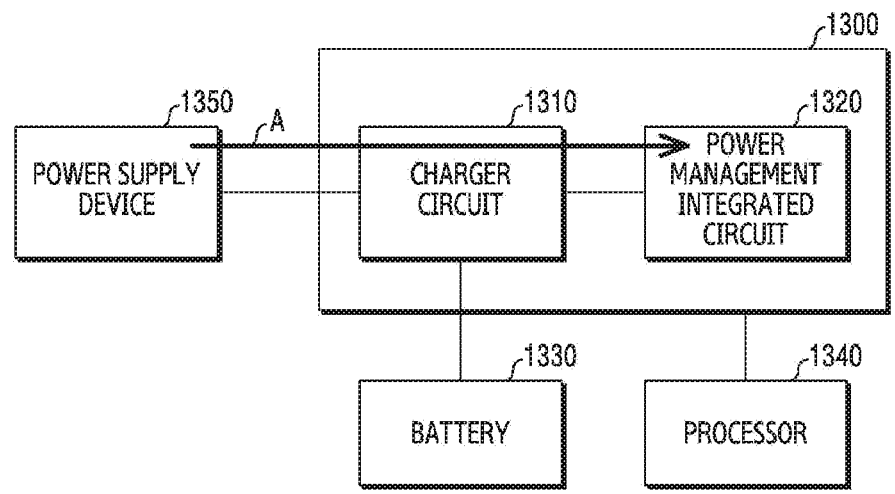
Figure 14:
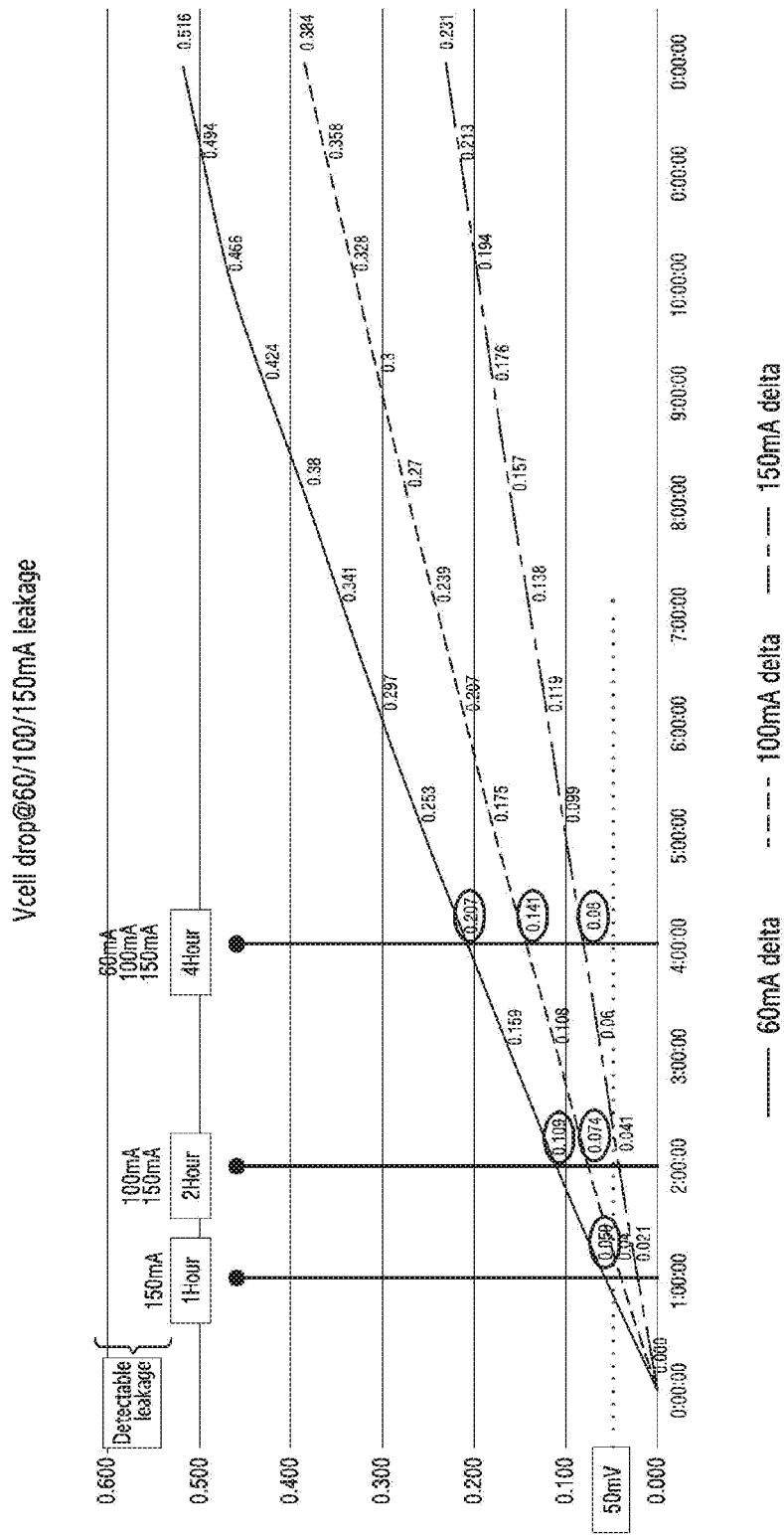
FIG. 14 illustrates a graph of battery state detection in an electronic device according to various embodiments of the present disclosure.

FIG. 12 illustrates a flowchart for detecting a battery state and controlling a battery in an electronic device according to various embodiments of the present disclosure. FIGS. 13A and 13B illustrate current flows in a circuit in an electronic device according to various embodiments of the present disclosure, and FIG. 14 illustrates a battery state detection graph in an electronic device according to various embodiments of the present disclosure.

FIGS. 12, 13A, 13B, and 14 illustrate operations for detecting a battery failure based on the second method (e.g., the voltage drop method) and controlling the battery state in response to the detected battery failure.

Referring to FIG. 12, in operation 1201, the processor 460 (or the processor 120 or 210 of FIG. 1 or FIG. 2, the controller 425 of FIG. 4) of the electronic device 400 can charge the battery 410.

In operation 1203, the processor 460 can detect an SOC (e.g., full charge) up to a preset capacity of the battery 410 during the charge of the battery 410.

In operation 1205, the processor 460 can open the battery 410 and the system load based on the detected SOC up to the preset capacity of the battery 410.

FIGS. 13A, and 13B illustrate current flows of an SOC, and a full charge state, respectively, according to a dual path in an electronic device 400.

In FIG. 13A, power supplied from a power supply device 1350 is charging a battery 1330 and supplied to a system load based on a charger circuit 1310 of a BMU 1300. As charging the battery 1330 (e.g., a battery charge path B), the electronic device 400 can supply the power to the system load through a PMIC 1320 of the BMU 1300 (e.g., a system load supply path A). The power supply device 1350 can supply first power to the system load according to an operation of the electronic device 400 when the battery 1330 is charged. The battery 1330 can be charged with second power from the power supply device 1350 according to a charge algorithm regardless of the system load.

When total power supplied from the power supply device 1350 is a third power and a sum of the first power and the second power exceeds the third power, the path can be modified using a switch circuit (e.g., an FET circuit) to supply the power of the battery 1330 to the system load. The switch circuit can be implemented in the charger circuit 1310, or between the charger circuit 1310 and the PMIC 1320, depending on implementation of the charger circuit 1310. When the switch circuit is implemented outside, the charge path to the battery 1330 can be designed as a path B', rather than the path B.

After the battery 1330 is fully charged, the power supply device 1350 stops supplying the charge power to the battery 1330 but can supply only the first power for the system load. For example, as illustrated in FIG. 13B, the battery charge path (e.g., the path B or the path B') may be open, and only the system load supply path (e.g., the path A) can be connected. In this case, the battery 1330 may not be connected to the system load. Hence, the battery 1330 is not discharged by the system load, and the battery 1330 can be discharged naturally. In various embodiments of the present disclosure, a processor 1340 can manage the third power which is the total power supplied from the power supply device 1350 and measure the first power for the system load at intervals. When the first power required for the system load is measured at intervals and the first power exceeds the third power, the processor 1340 can control the BMU 1300 to modify the switch circuit to supply the power of the battery 1330 to the system load. The electronic device 400 can include a switch circuit (e.g., an FET circuit) to automatically change the path according to the required power of the system load. For example, the switch circuit itself can automatically change the path, rather than controlling the BMU 1300 through the processor 1340.

According to various embodiments of the present disclosure, on a condition that the connection of the power supply device 1350 is maintained after the full charge of the battery 1330, the processor 1340 can check leakage according to a voltage (e.g., OCV) variance based on the natural discharge of the battery 1330.

Referring back to FIG. 12, in operation 1207, the processor 460 can measure the voltage (e.g., OCV) at a first time with the open state between the battery 410 and the system load. The processor 460 can measure a first voltage after a certain time (e.g., the first time) from the full charge (e.g., the charge current decreases and reaches to the EOC) of the battery 410. As the current charge is turned off (e.g., the power supply device 480 is removed) after fully charging of the battery 410, a time for stabilizing the voltage of the battery 410 may be needed. For doing so, the processor 460 can measure the voltage, but is not limited to, after the certain time from the full charge. The processor 460 may measure the voltage at the full charge.

In operation 1209, the processor 460 can set the voltage measured at the first time as a reference voltage. In various embodiments of the present disclosure, the reference voltage to be compared with the current voltage measured can use, but is not limited to, a voltage measured just before the current time. The reference voltage may be set to a voltage measured at an initial time (e.g., the first time) after the full charge.

In operation 1211, the processor 460 can measure the voltage at a second time. The processor 460 can measure the voltage (e.g., OCV) at preset intervals. For example, after the first time, the processor 460 can measure the voltage at the second time of the preset interval.

In operation 1213, the processor 460 can determine a variance between the reference voltage and the measured voltage. The processor 460 can determine the voltage variance based on a difference of the first time voltage (e.g., the reference voltage) and the second time voltage (e.g., the measured voltage).

In operation 1215, the processor 460 can determine whether the difference of the reference voltage and the measured voltage falls within a preset range. The processor 460 can determine whether the difference between the measured voltages (e.g., the difference between the reference voltage and the measured voltage) of the battery 410 of the first time and the second time exceeds a preset reference value. The processor 460 can obtain an OCV value at intervals and determine whether the OCV value exceeds a reference OCV value (e.g., 50 mV). An embodiment is described with reference to Table 1 and FIG. 14.

TABLE 1

| time | static leakage |
| --- | --- |
| one-hour time | over 150 mA |
| two-hours time | over 100 mA |
| four-hours time | over 60 mA |
| eight-hours time | over 50 mA |
| twenty-hours time | over 10 mA |
| 32-hours time | over 5 mA |

In Table 1 and FIG. 14, the processor 460 detects the voltage (e.g., OCV) at intervals (e.g., based on time unit) and determines whether the detected voltage is different from the reference voltage (e.g., Ref OCV) over the preset reference voltage (e.g., 50 mV).

In Table 1 and FIG. 14, a battery failure can be detected at a one-hour time with a static leakage over 150 mA (e.g., the measured OCV value is different from the reference OCV value by over 50 mV), a battery failure can be detected at a two-hour time with the static leakage over 100 mA, and a battery failure can be detected at a four-hour time with the static leakage over 60 mA. As illustrated in Table 1 and FIG. 14, the detectable leakage value can decrease as time passes. The preset interval for measuring the voltage (e.g., OCV) after the full charge of the battery 410 can be the time unit, and the detectable leakage value can reduce at each measurement time.

Referring back to FIG. 12, when the voltage difference does not fall within the preset range in operation 1215, the processor 460 can go to operation 1207. The processor 460 can measure the voltage (e.g., OCV) based on a next interval (e.g., a third time) and calculate a difference between the measured voltage and the previous voltage.

When the voltage difference falls within the preset range in operation 1215, the processor 460 can determine a failure of the battery 410 in operation 1217. For example, the processor 460 can determine the leakage of the battery 410.

In response to the determined battery leakage, the processor 460 can control operation of the battery 410 in operation 1219. The processor 460 can output notification information. The processor 460 can turn off the electronic device 400. The processor 460 can determine a battery control method based on a type of the battery failure and change the state of the battery 410 based on the determined control method.

The BMU 420 can execute at least one of operations 1201 through 1219 under the control of the processor 460 or by itself. When the BMU 420 includes the controller 425, it may autonomously execute at least one of operations 1201 through 1219 based on the controller 425.

Figure 15:
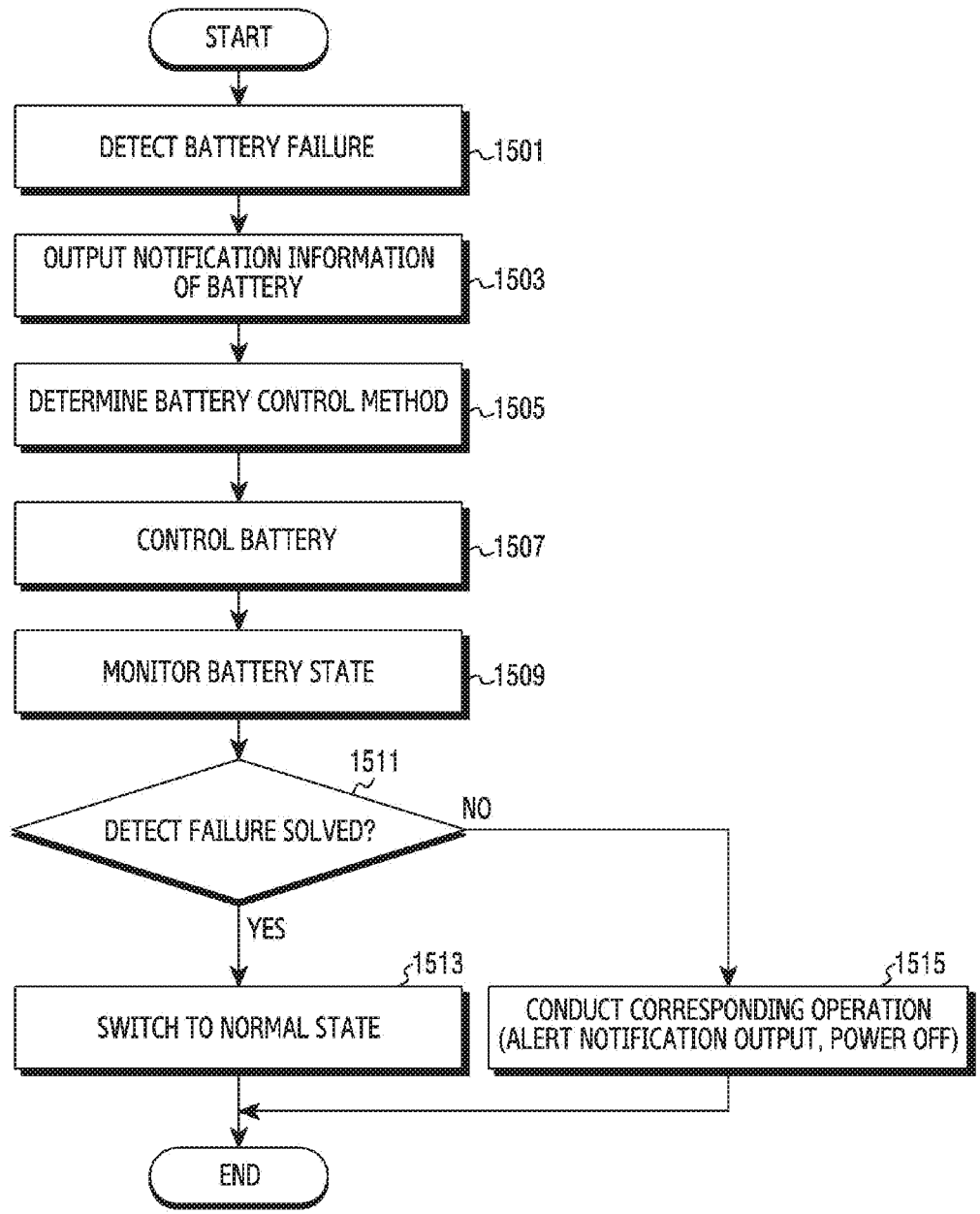
FIG. 15 illustrates a flowchart for controlling a battery in an electronic device according to various embodiments of the present disclosure.

FIG. 15 illustrates a flowchart for controlling a battery in an electronic device according to various embodiments of the present disclosure.

Referring to FIG. 15, in operation 1501, the processor 460 (or the processor 120 or 210 of FIG. 1 or FIG. 2, the controller 425 of FIG. 4) of the electronic device 400 can detect a battery failure. According to various embodiments of the present disclosure, the processor 460 can detect leakage of the battery 410 based on at least part of the first method and the second method as mentioned earlier.

In operation 1503, the processor 460 can output notification information regarding the battery 410 based on the detected battery failure. The processor 460 can display a UI notifying the leakage of the battery 410 through the display 160 or 260. The notification information can be provided based on at least part of visual output (e.g., UI, LED, etc.), audible output (e.g., voice audio), and tactile output (e.g., vibration feedback).

In operation 1505, the processor 460 can determine the battery control method. The processor 460 can determine the battery control method and output the notification information in sequence, in parallel, or in reverse order. The notification information output can be used as an example of the battery control method. In this case, operation 1505 can precede to operation 1507. In operation 1507, the processor 460 can control the battery based on the determined battery control method. The processor 460 can change the state of the battery 410.

In operation 1509, the processor 460 can monitor the state of the battery 410 in response to the battery control.

In operation 1511, the processor 460 can determine based on the monitoring result whether the failure of the battery 410 is addressed. The processor 460 can monitor the state of the battery 410 based on the aforementioned battery failure (e.g., leakage) detection method, and determine whether the failure is addressed (e.g., the leakage current is decreased) based on the monitoring result.

When the battery failure is solved in operation 1511, the processor 460 can switch the battery 410 from the failure state to the normal state in operation 1513. The processor 460 can change the charge mode according to the preset method in response to the detected battery failure, and restore the charge mode in response to the addressed battery failure. The processor 460 can switch the battery 410 to the normal state and then continue to detect the battery failure.

When the battery failure is not solved in operation 1511, the processor 460 can process a corresponding operation in operation 1515. Based on the preset method, the processor 460 can provide the user with an alert notification about an emergency or turn off the electronic device 400 to prevent an accident.

According to various embodiments of the present disclosure, the BMU 420 can execute at least one of operations 1501 through 1515 under the control of the processor 460 or by itself. When the BMU 420 includes the controller 425, it may autonomously execute at least one of operations 1501 through 1515 based on the controller 425.

Figure 16:
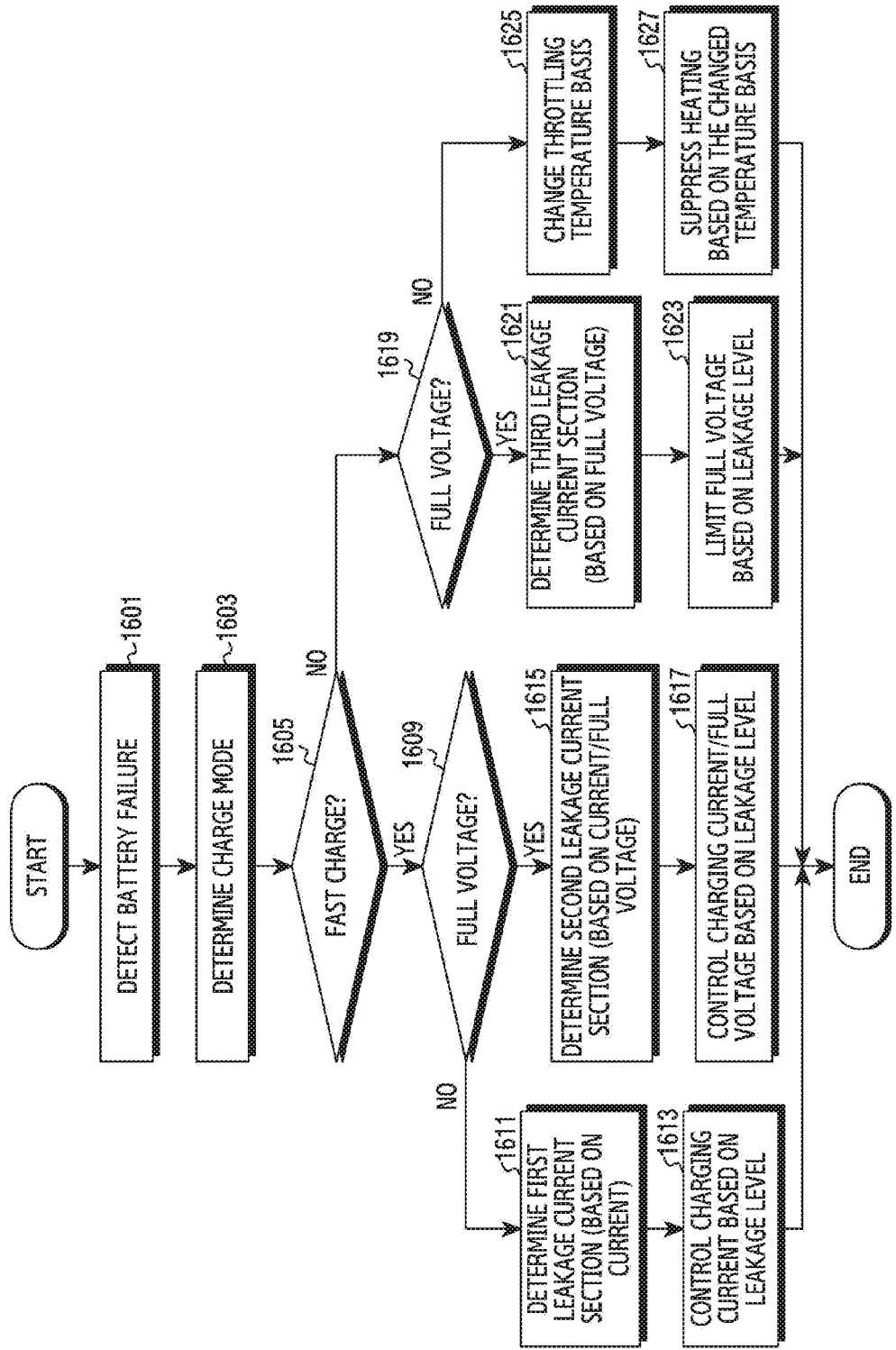
FIG. 16 illustrates a flowchart of a battery control method for stabilizing a battery state in an electronic device according to various embodiments of the present disclosure.

FIG. 16 illustrates a flowchart of a battery control method for stabilizing a battery state in an electronic device according to various embodiments of the present disclosure.

Referring to FIG. 16, in operation 1601, the processor 460 (or the processor 120 or 210 of FIG. 1 or FIG. 2, the controller 425 of FIG. 4) of the electronic device 400 can detect a battery failure. The processor 460 can detect leakage of the battery 410 based on at least part of the first method and the second method as described earlier.

Based on the battery failure detected, the processor 460 can determine a charge mode of the battery 410 in operation 1603.

In operation 1605, the processor 460 can determine whether the charge mode is a fast charge mode (e.g., a first charge method) or a normal charge mode (e.g., a second charge method) based on the determination.

When the charge mode is the fast charge in operation 1605, the processor 460 can determine whether the battery 410 is charged with the full voltage in the fast charge mode in operation 1609.

When detecting not to use the full voltage in operation 1609, the processor 460 can determine a first leakage current section based on the current in operation 1611. The processor 460 can determine a leakage level according to the amount of the leakage current based on a predefined current based control table as shown in Table 2.

TABLE 2

| Leakage level (mA) | operation |
|---|---|
| first leakage level | stop the fast charge, switch to the normal charge mode |
| second leakage level | charging the battery with less current than the normal charge current |
| third leakage level | charging the battery with a smaller amount of the current than the normal charge current (trickle charging) |
| fourth leakage level | Charging the battery while repeating charging and interrupting a very low current in a short period of time |
| fifth leakage level | Charge current blocking |

In operation 1613, the processor 460 can control (e.g., regulate) the charging current based on the determined leakage level. The processor 460 can switch the charge mode from the fast charge to the normal charge by controlling the charging current. To change the charge mode, the processor 460 can lower the charging current according to the amount of the leakage current, or regulate the charging current (e.g., trickle charging). The processor 460, upon determining the first leakage level, can stop the fast charge and switch to the normal charge mode. When determining the third leakage level, the processor 460 can control the trickle charging which charges the battery 410 with a smaller amount of the current than the normal charge current.

When detecting to use the full voltage in operation 1609, the processor 460 can determine a second leakage current section based on the current/full voltage in operation 1615. According to an embodiment of the present disclosure, the processor 460 can determine the leakage level according to the amount of the leakage current based on a predefined current/full voltage based control table. As shown in Table 3, the predefined current/full voltage based control table can include combinations of the operations per leakage current section of Table 2.

TABLE 3

| Leakage level (mA) | operation |
|---|---|
| first leakage level | stop the fast charge, limit the full voltage to 90% |
| second leakage level | charging the battery with less current than the normal charge current, limit the full voltage to 70% |
| third leakage level | charging the battery with a smaller amount of the current than the normal charge current (trickle charging), limit the full voltage to 50% |
| fourth leakage level | Charging the battery while repeating charging and interrupting a very low current in a short period of time, limit the full voltage to 30% |
| fifth leakage level | Charge current blocking |

In operation 1617, the processor 460 can control (e.g., regulate) the charging current and the full voltage based on the determined leakage level. When determining the first leakage level, the processor 460 can stop the fast charge and limit the full voltage to 90%. When determining the third leakage level, the processor 460 can control the trickle charge which charges the battery 410 with a smaller amount of the current than the normal charge current, and limit the full voltage to 50%.

When the charge mode is not the fast charge mode in operation 1605, for example, when the charge mode is the normal charge mode, the processor 460 can determine whether the battery 410 is charged with the full voltage in the normal charge mode in operation 1619.

When detecting the full voltage in operation 1619, the processor 460 can determine a third leakage current section based on the full voltage in operation 1621. The processor 460 can determine the leakage level according to the amount of the leakage current based on a predefined full voltage based control table as shown in Table 4.

TABLE 4

| Leakage level (mA) | operation |
|---|---|
| first leakage level | stop the fast charge, maintain the full voltage |
| second leakage level | limit the full voltage to 80% |
| third leakage level | limit the full voltage to 60% |
| fourth leakage level | limit the full voltage to 40% |
| fifth leakage level | limit the full voltage to 30% |

In operation 1623, the processor 460 can control (e.g., regulate) the full voltage based on the determined leakage level. The processor 460, upon determining the first leakage level, can stop the fast charge and maintain the full voltage without changing it. When determining the fifth leakage level, the processor 460 can limit the full voltage to 30%.

When detecting not to use the full voltage in operation 1619, the processor 460 can change a temperature basis of throttling (e.g., temperature controlling) in operation 1625. The processor 460 can lower the temperature basis of the throttling according to existing heating.

In operation 1627, the processor 460 can suppress heating according to the changed temperature basis. The processor 460 can restrict the use of the battery 410 and control the electronic device 400 in a hibernation mode to suppress the heating of another component.

According to various embodiments of the present disclosure, the BMU 420 can execute at least one of operations 1601 through 1627 under the control of the processor 460 or by itself. When the BMU 420 includes the controller 425, it may autonomously execute at least one of operations 1601 through 1627 based on the controller 425.

When the internal leakage of the battery 410 exceeds the reference based on the battery failure detection, the processor 460 can change the state of the battery 410 by controlling the charge algorithm such as charge current and/or full voltage, and/or a thermal algorithm.

According to various embodiments of the present disclosure, beside the above-stated control methods, the processor 460 can notify the user of the detected leakage of the battery 410 and thus prevent an accident involving the user. The processor 460 can provide a notification to the user at least by displaying a guide message about danger, displaying a battery icon in a different shape or color, or guiding a location/phone number of a customer service based on location information. The processor 460 may send notification information to an external electronic device such as a wearable device (e.g., a watch), or electronic device 102 or 104 functionally coupled with the electronic device 400. The processor 460 may transmit the leakage information of the battery 410 to an external device (e.g., the server 106, a manufacturer's server, a provider server, etc.) functionally coupled with the electronic device 400

A method for operating an electronic device according to various embodiments of the present disclosure includes charging a battery using a charger circuit, determining whether the charging operation satisfies a preset condition, when the charging operation satisfies the preset condition, obtaining first state information of the battery using a measurement circuit (e.g., a BMU 420, a power management circuit, a battery state measuring circuit 430, a coulomb counter 450, etc.), determining an abnormal state of the battery at least based on a difference between the first state information and second state information which is obtained when the preset condition is satisfied before the first state information is acquired, and outputting notification information regarding the abnormal state.

According to various embodiments of the present disclosure, determining the battery state can include obtaining a first capacity of the charged battery, as at least part of the first state information, and obtaining a second capacity of the battery previously charged, as at least part of the second state information.

According to various embodiments of the present disclosure, determining the battery state can include determining whether the battery is charged up to a maximum capacity, as at least part of the preset condition, and stopping the charging operation when the battery is charged up to the maximum capacity.

According to various embodiments of the present disclosure, determining the battery state can include, after a preset time from the stopped charging operation, measuring a first voltage of the battery as at least part of the second state information, and after another preset time from the first voltage measurement, measuring a second voltage of the battery as at least part of the first state information.

According to various embodiments of the present disclosure, the electronic device can further include a power management circuit, and a switch for selectively connecting the battery and the power management circuit, and the method can further include measuring the voltage by opening the battery and the power management circuit using the switch, as at least part of the measurement of the first voltage and the second voltage.

According to various embodiments of the present disclosure, the method can further include, when determining the abnormal battery state during the battery charging, stopping the battery charging operation, and the abnormal state can include a state where a difference of a value corresponding to the second state information and a value corresponding to the first state information exceeds a preset reference value.

According to various embodiments of the present disclosure, the method can further include, when determining the abnormal battery state during the battery charging, stopping the battery charging operation, and, when the battery switches from the abnormal state to a normal state, resuming the battery charging operation.

According to various embodiments, outputting the notification information can include sending at least part of the notification information to an external electronic device functionally connected with the electronic device, as at least part of the notification information output operation.

The electronic device and its operating method according to various embodiments of the present disclosure can detect the leakage in the battery by measuring the current or the voltage and thus prevent a fire accident due to the overcharging of the battery. By detecting the leakage current of the battery in advance, it is possible to prevent a malfunction and/or a fault inside the electronic device due to the leakage current and to protect the user from various accidents caused by the leakage current of the battery.

According to various embodiments of the present disclosure, the electronic device can detect an internal short and thus ensure safety from the battery failure. The electronic device can improve its usability, convenience, or safety.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a battery;
a charger circuit for receiving power from an external electronic device and charging the battery;
a measurement circuit for checking a state of the battery; and
a processor,
wherein, while the power is received from the external electronic device, the processor is configured to:
charge, based on the power received from the external electronic device, the battery using the charger circuit,
determine whether a charging operation satisfies a preset condition,
when the charging operation satisfies the preset condition, obtain a first measurement value at a first time using the measurement circuit, wherein the first measurement value corresponds to charges accumulated in the battery at the first time,
determine a current leakage of the battery when a difference between the first measurement value obtained at the first time and a second measurement value which is obtained when the preset condition is satisfied at a second time exceeds a preset reference value, wherein the second measurement value corresponds to charges accumulated in the battery at the second time, and wherein the second time is before the first time and the second measurement value is smaller than the first measurement value, and
output notification information regarding the current leakage.

2. The electronic device of claim 1, wherein the processor is further configured to obtain a first capacity of the charged battery, as at least part of the first measurement value, and obtain a second capacity of the battery previously charged, as at least part of the second measurement value.

3. The electronic device of claim 1, wherein the processor is further configured to determine whether the battery is charged up to a maximum capacity, as at least part of the preset condition, and
stop the charging operation when the battery is charged up to the maximum capacity.

4. The electronic device of claim 1, wherein the measurement circuit comprises at least one of a circuit for measuring a voltage of the battery, a circuit for measuring a remaining capacity of the battery, or a circuit for measuring an amount of an electrical charge which is input and output to and from the battery.

5. The electronic device of claim 1, wherein, when determining the current leakage during the battery charge, the processor is configured to store state information indicating the battery charge.

6. The electronic device of claim 5, wherein, when the battery switches from an abnormal state related to the current leakage to a normal state, the processor is configured to resume charging the battery.

7. The electronic device of claim 1, wherein the processor is further configured to send at least part of the notification information to an external electronic device functionally connected with the electronic device, as at least part of the notification information output operation.

8. The electronic device of claim 1, further comprising:
a memory for storing at least one of the first measurement value or the second measurement value.

9. An electronic device comprising:
a battery;
a charger circuit for receiving power from an external electronic device and charging the battery;
a measurement circuit for checking a state of the battery; and
a processor,
wherein, while the power is received from the external electronic device, the processor is configured to:
charge, based on the power received from the external electronic device, the battery using the charger circuit,
measure a first voltage of the battery at a first time with no current supplied from the battery to the electronic device,
measure a second voltage of the battery at a second time with no current supplied from the battery to the electronic device,
determine a current leakage of the battery based on at least the first voltage of the battery measured at the first time and the second voltage of the battery measured at the second time,
determine a battery control method for resolving the current leakage, and
in response to determining that the battery control method did not resolve the current leakage, output notification information regarding the current leakage to a user.

10. The electronic device of claim 9, wherein the processor is further configured to determine whether the battery is charged up to a maximum capacity, as at least part of a preset condition, and
stop the charging operation when the battery is charged up to the maximum capacity,
after a preset time from the stopped charging operation, measure the first voltage of the battery, and
after another preset time from the first voltage measurement, measure the second voltage of the battery.

11. The electronic device of claim 10, further comprising:
a power management circuit; and
a switch for selectively connecting the battery and the power management circuit,
wherein the processor is configured to open the battery and the power management circuit using the switch, as at least part of the measurement of the first voltage and the second voltage.

12. A method for operating an electronic device while receiving power from an external electronic device, comprising:
receiving the power from the external electronic device;
charging, based on the power received from the external electronic device, a battery using a charger circuit;
determining whether a charging operation satisfies a preset condition;
when the charging operation satisfies the preset condition, obtaining a first measurement value at a first time using a measurement circuit, wherein the first measurement value corresponds to charges accumulated in the battery at the first time;
determining a current leakage of the battery when a difference between the first measurement value obtained at the first time and a second measurement value which is obtained when the preset condition is satisfied at a second time exceeds a preset reference value, wherein the second measurement value corresponds to charges accumulated in the battery at the second time, and wherein the second time is before the first time and the second measurement value is smaller than the first measurement value; and
outputting notification information regarding the current leakage.

13. The method of claim 12, wherein determining the battery state comprises:
obtaining a first capacity of the charged battery, as at least part of the first measurement value; and
obtaining a second capacity of the battery previously charged, as at least part of the second measurement value.

14. The method of claim 12, further comprising:
when determining an abnormal state related to the current leakage during the battery charging, stopping the battery charging operation; and
when the battery switches from the abnormal state to a normal state, resuming the battery charging operation.

15. The method of claim 12, wherein outputting the notification information comprises:
sending at least part of the notification information to an external electronic device functionally connected with the electronic device, as at least part of the notification information output operation.

* * * * *